(12) United States Patent
Raghavan et al.

(10) Patent No.: US 12,362,809 B2
(45) Date of Patent: Jul. 15, 2025

(54) USER EQUIPMENT (UE) ANTENNA MODULE LOCK FUNCTION

(71) Applicant: QUALCOMM Incorporated, San Diego, CA (US)

(72) Inventors: Vasanthan Raghavan, West Windsor Township, NJ (US); Benjamin Cheadle, San Diego, CA (US); Raghu Narayan Challa, San Diego, CA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 18/541,721

(22) Filed: Dec. 15, 2023

(65) Prior Publication Data
US 2025/0202562 A1 Jun. 19, 2025

(51) Int. Cl.
*H04L 5/12* (2006.01)
*H04B 7/06* (2006.01)

(52) U.S. Cl.
CPC ......... *H04B 7/0695* (2013.01); *H04B 7/0639* (2013.01)

(58) Field of Classification Search
CPC ............................. H04B 7/0695; H04B 7/0639
USPC ................ 375/262, 260, 259, 219, 295, 316
See application file for complete search history.

(56) References Cited

U.S. PATENT DOCUMENTS

2022/0225118 A1* 7/2022 Pefkianakis ........ H04W 64/006

* cited by examiner

*Primary Examiner* — Zewdu A Kassa
(74) *Attorney, Agent, or Firm* — Holland & Hart LLP

(57) ABSTRACT

Methods, systems, and devices for wireless communications systems are described. A user equipment (UE) may receive, from a network entity, a set of beam-swept synchronization signals associated with a testing procedure for the UE. The UE may select a first beam pair associated with a first antenna module of the UE from a set of multiple beam pairs associated with the received synchronization signals. The UE may receive a first module lock command and a first beam lock command, and may utilize the commands in performing a first set of measurements of the first beam pair at the first antenna module. The UE may receive a first beam lock deactivation command to release the first beam lock command of the first beam pair, and a first module lock deactivation command to release the first module lock command of the first antenna module.

30 Claims, 14 Drawing Sheets

USER EQUIPMENT (UE) ANTENNA MODULE LOCK FUNCTION

TECHNICAL FIELD

The following relates to wireless communications, including user equipment (UE) antenna module lock function for millimeter wave frequencies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support user equipment (UE) antenna module lock function. For example, the described techniques support enhanced performance/conformance testing procedures for wireless signaling between wireless communications devices. For example, during a testing procedure, a UE may receive a set of multiple beam-swept synchronization signals from a network entity. The UE may then select a first beam pair from a set of multiple beam pairs associated with the beam-swept synchronization signals, where the first beam pair corresponds to a first antenna module of the UE. The UE may then receive a first antenna module lock command from the network entity which includes instructions for the UE to perform communications with the first antenna module for a duration of the first antenna module lock command. The UE may also receive a first beam lock command which includes instructions for the UE to perform communications with the first beam pair for a duration of the first beam lock command. Based on receiving the antenna module lock command and the beam lock command, the UE may perform a first set of measurements of the first beam pair at the first antenna module. Subsequent to performing beam measurements, the UE may receive a first beam lock deactivation command which includes instructions to release the first beam lock command of the first beam pair, and a first antenna module lock deactivation command which includes instructions to release the first antenna module lock command of the first antenna module.

A method for wireless communications by a UE is described. The method may include receiving, from a network entity, a set of multiple beam-swept synchronization signals associated with a testing procedure for the UE, selecting a first beam pair from a set of multiple beam pairs associated with the set of multiple beam-swept synchronization signals, where the first beam pair corresponds to a first antenna module of the UE, receiving, from the network entity, a first module lock command including instructions for the UE to perform communications with the first antenna module for a duration of the first module lock command, receiving, from the network entity, a first beam lock command including instructions for the UE to perform communications with the first beam pair for a duration of the first beam lock command, performing a first set of measurements of the first beam pair at the first antenna module in accordance with the first module lock command and the first beam lock command, receiving, from the network entity, a first beam lock deactivation command including instructions to release the first beam lock command of the first beam pair, and receiving, from the network entity, a first module lock deactivation command including instructions to release the first module lock command of the first antenna module.

A UE for wireless communications is described. The UE may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the UE to receive, from a network entity, a set of multiple beam-swept synchronization signals associated with a testing procedure for the UE, select a first beam pair from a set of multiple beam pairs associated with the set of multiple beam-swept synchronization signals, where the first beam pair corresponds to a first antenna module of the UE, receive, from the network entity, a first module lock command including instructions for the UE to perform communications with the first antenna module for a duration of the first module lock command, receive, from the network entity, a first beam lock command including instructions for the UE to perform communications with the first beam pair for a duration of the first beam lock command, perform a first set of measurements of the first beam pair at the first antenna module in accordance with the first module lock command and the first beam lock command, receive, from the network entity, a first beam lock deactivation command including instructions to release the first beam lock command of the first beam pair, and receive, from the network entity, a first module lock deactivation command including instructions to release the first module lock command of the first antenna module.

Another UE for wireless communications is described. The UE may include means for receiving, from a network entity, a set of multiple beam-swept synchronization signals associated with a testing procedure for the UE, means for selecting a first beam pair from a set of multiple beam pairs associated with the set of multiple beam-swept synchronization signals, where the first beam pair corresponds to a first antenna module of the UE, means for receiving, from the network entity, a first module lock command including instructions for the UE to perform communications with the first antenna module for a duration of the first module lock command, means for receiving, from the network entity, a first beam lock command including instructions for the UE to perform communications with the first beam pair for a duration of the first beam lock command, means for performing a first set of measurements of the first beam pair at the first antenna module in accordance with the first module lock command and the first beam lock command, means for receiving, from the network entity, a first beam lock deactivation command including instructions to release the first beam lock command of the first beam pair, and means for receiving, from the network entity, a first module lock deactivation command including instructions to release the first module lock command of the first antenna module.

A non-transitory computer-readable medium storing code for wireless communications is described. The code may include instructions executable by at least one processor (e.g., directly, indirectly, after pre-processing, without pre-processing) to receive, from a network entity, a set of multiple beam-swept synchronization signals associated with a testing procedure for the UE, select a first beam pair from a set of multiple beam pairs associated with the set of multiple beam-swept synchronization signals, where the first beam pair corresponds to a first antenna module of the UE, receive, from the network entity, a first module lock command including instructions for the UE to perform communications with the first antenna module for a duration of the first module lock command, receive, from the network entity, a first beam lock command including instructions for the UE to perform communications with the first beam pair for a duration of the first beam lock command, perform a first set of measurements of the first beam pair at the first antenna module in accordance with the first module lock command and the first beam lock command, receive, from the network entity, a first beam lock deactivation command including instructions to release the first beam lock command of the first beam pair, and receive, from the network entity, a first module lock deactivation command including instructions to release the first module lock command of the first antenna module.

Some examples of the method, UEs, and non-transitory computer-readable medium described herein may further include operations, features, means, or instructions for selecting, prior to receiving the first module lock deactivation command, a second beam pair from the set of multiple beam pairs, where the second beam pair corresponds to the first antenna module of the UE, receiving, from the network entity, a second beam lock command including instructions for the UE to perform communications with the second beam pair for a duration of the second beam lock command, performing a second set of measurements of the second beam pair at the first antenna module in accordance with the first module lock command and the second beam lock command, and receiving, from the network entity, a second beam lock deactivation command including instructions to release the second beam lock command of the second beam pair.

In some examples of the method, UEs, and non-transitory computer-readable medium described herein, the first module lock command enables a module lock function at the UE and the method, apparatuses, and non-transitory computer-readable medium may include further operations, features, means, or instructions for refraining from switching from the first antenna module to a second antenna module in accordance with the module lock function.

In some examples of the method, UEs, and non-transitory computer-readable medium described herein, performing the first set of measurements of the first beam pair at the first antenna module may include operations, features, means, or instructions for receiving, from the network entity, an uplink grant including a request for the first set of measurements of the first beam pair and transmitting, in accordance with the uplink grant, an indication of the first set of measurements.

In some examples of the method, UEs, and non-transitory computer-readable medium described herein, performing the first set of measurements may include operations, features, means, or instructions for performing the first set of measurements at the UE, where the UE may be at a first relative location or relative orientation and performing, prior to receiving the first module lock deactivation command, a second set of measurements for a second beam pair at the UE, where the UE may be at a second relative location or second relative orientation.

Some examples of the method, UEs, and non-transitory computer-readable medium described herein may further include operations, features, means, or instructions for performing, prior to receiving the first module lock deactivation command, a set of multiple measurements for a set of multiple different beam pairs selected by the UE.

In some examples of the method, UEs, and non-transitory computer-readable medium described herein, each beam pair of the set of multiple beam pairs correspond to different relative locations of the UE, different relative orientations of the UE, or both.

Some examples of the method, UEs, and non-transitory computer-readable medium described herein may further include operations, features, means, or instructions for performing a second set of measurements for a second antenna module in accordance with a second antenna module lock command, where the UE receives the first module lock deactivation command and the first beam lock deactivation command prior to performing the second set of measurements.

In some examples of the method, UEs, and non-transitory computer-readable medium described herein, the first antenna module corresponds to a first antenna polarization.

In some examples of the method, UEs, and non-transitory computer-readable medium described herein, the testing procedure includes a conformance testing procedure for the UE and the UE may be configured in a field test mode.

In some examples of the method, UEs, and non-transitory computer-readable medium described herein, selecting the first beam pair may include operations, features, means, or instructions for selecting the first beam pair based on the first beam pair having a relative highest average reference signal receive power of the set of multiple beam pairs.

In some examples of the method, UEs, and non-transitory computer-readable medium described herein, the first set of measurements for the first beam pair include one or more spherical coverage metrics of the UE, including at least an effective isotropic radiated power, an effective isotropic sensitivity, or both.

A method for wireless communications by a network entity is described. The method may include transmitting, to a UE, a set of multiple beam-swept synchronization signals associated with a testing procedure for the UE, receiving an indication of a first beam pair from a set of multiple beam pairs associated with the set of multiple beam-swept synchronization signals, where the first beam pair corresponds to a first antenna module of the UE, transmitting, to the UE, a first module lock command including instructions for the UE to perform communications with the first antenna module for a duration of the first module lock command, transmitting, to the UE, a first beam lock command including instructions for the UE to perform communications with the first beam pair for a duration of the first beam lock command, receiving, from the UE via the first beam pair, a first uplink message in response to an uplink grant, performing a first set of measurements of the first beam pair for the UE operating in accordance with the first module lock command and the first beam lock command, transmitting, to the UE, a first beam lock deactivation command including instructions to release the first beam lock command of the first beam pair, and transmitting, to the UE, a first module lock deactivation command including instructions to release the first module lock command of the first antenna module.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the network entity to transmit, to a UE, a set of multiple beam-swept synchronization signals associated with a testing procedure for the UE, receive an indication of a first beam pair from a set of multiple beam pairs associated with the set of multiple beam-swept synchronization signals, where the first beam pair corresponds to a first antenna module of the UE, transmit, to the UE, a first module lock command including instructions for the UE to perform communications with the first antenna module for a duration of the first module lock command, transmit, to the UE, a first beam lock command including instructions for the UE to perform communications with the first beam pair for a duration of the first beam lock command, receive, from the UE via the first beam pair, a first uplink message in response to an uplink grant, perform a first set of measurements of the first beam pair for the UE operating in accordance with the first module lock command and the first beam lock command, transmit, to the UE, a first beam lock deactivation command including instructions to release the first beam lock command of the first beam pair, and transmit, to the UE, a first module lock deactivation command including instructions to release the first module lock command of the first antenna module.

Another network entity for wireless communications is described. The network entity may include means for transmitting, to a UE, a set of multiple beam-swept synchronization signals associated with a testing procedure for the UE, means for receiving an indication of a first beam pair from a set of multiple beam pairs associated with the set of multiple beam-swept synchronization signals, where the first beam pair corresponds to a first antenna module of the UE, means for transmitting, to the UE, a first module lock command including instructions for the UE to perform communications with the first antenna module for a duration of the first module lock command, means for transmitting, to the UE, a first beam lock command including instructions for the UE to perform communications with the first beam pair for a duration of the first beam lock command, means for receiving, from the UE via the first beam pair, a first uplink message in response to an uplink grant, means for performing a first set of measurements of the first beam pair for the UE operating in accordance with the first module lock command and the first beam lock command, means for transmitting, to the UE, a first beam lock deactivation command including instructions to release the first beam lock command of the first beam pair, and means for transmitting, to the UE, a first module lock deactivation command including instructions to release the first module lock command of the first antenna module.

A non-transitory computer-readable medium storing code for wireless communications is described. The code may include instructions executable by at least one processor (e.g., directly, indirectly, after pre-processing, without pre-processing) to transmit, to a UE, a set of multiple beam-swept synchronization signals associated with a testing procedure for the UE, receive an indication of a first beam pair from a set of multiple beam pairs associated with the set of multiple beam-swept synchronization signals, where the first beam pair corresponds to a first antenna module of the UE, transmit, to the UE, a first module lock command including instructions for the UE to perform communications with the first antenna module for a duration of the first module lock command, transmit, to the UE, a first beam lock command including instructions for the UE to perform communications with the first beam pair for a duration of the first beam lock command, receive, from the UE via the first beam pair, a first uplink message in response to an uplink grant, perform a first set of measurements of the first beam pair for the UE operating in accordance with the first module lock command and the first beam lock command, transmit, to the UE, a first beam lock deactivation command including instructions to release the first beam lock command of the first beam pair, and transmit, to the UE, a first module lock deactivation command including instructions to release the first module lock command of the first antenna module.

Some examples of the method, network entities, and non-transitory computer-readable medium described herein may further include operations, features, means, or instructions for transmitting, to the UE prior to transmission of the first module lock command, a second beam lock command including instructions for the UE to perform communications with a second beam pair for a duration of the second beam lock command, performing a second set of measurements of the second beam pair associated with the first antenna module in accordance with the first module lock command and the second beam lock command, and transmitting, to the UE, a second beam lock deactivation command including instructions to release the second beam lock command of the second beam pair.

In some examples of the method, network entities, and non-transitory computer-readable medium described herein, the first module lock command enables a module lock function, and the method, apparatuses, and non-transitory computer-readable medium may include further operations, features, means, or instructions for instructing the UE to refrain from switching from the first antenna module to a second antenna module in accordance with the module lock function.

In some examples of the method, network entities, and non-transitory computer-readable medium described herein, performing the first set of measurements may include operations, features, means, or instructions for performing the first set of measurements for the UE at a first relative location or relative orientation and performing, prior to transmitting the first module lock deactivation command, a second set of measurements for the UE at a second relative location or second relative orientation.

Some examples of the method, network entities, and non-transitory computer-readable medium described herein may further include operations, features, means, or instructions for performing, prior to transmission of the first module lock deactivation command, a set of multiple measurements for a set of multiple different beam pairs selected by the UE.

In some examples of the method, network entities, and non-transitory computer-readable medium described herein, each beam pair of the set of multiple beam pairs correspond to different relative locations of the UE, different relative orientations of the UE, or both.

Some examples of the method, network entities, and non-transitory computer-readable medium described herein may further include operations, features, means, or instructions for performing a second set of measurements in accordance with a second antenna module lock command, where the network entity transmits the first module lock deactivation command and the first beam lock deactivation command prior to performing the second set of measurements.

In some examples of the method, network entities, and non-transitory computer-readable medium described herein, transmitting the set of multiple beam-swept synchronization signals may include operations, features, means, or instructions for transmitting the set of multiple beam-swept synchronization signals in accordance with a first polarization state of the network entity.

In some examples of the method, network entities, and non-transitory computer-readable medium described herein, the testing procedure includes a conformance testing procedure and the network entity may be configured in a field test mode.

In some examples of the method, network entities, and non-transitory computer-readable medium described herein, the first set of measurements for the first beam pair include one or more spherical coverage metrics, including at least an effective isotropic radiated power (EIRP), an effective isotropic sensitivity (EIS), or both.

DETAILED DESCRIPTION

Figure 1:
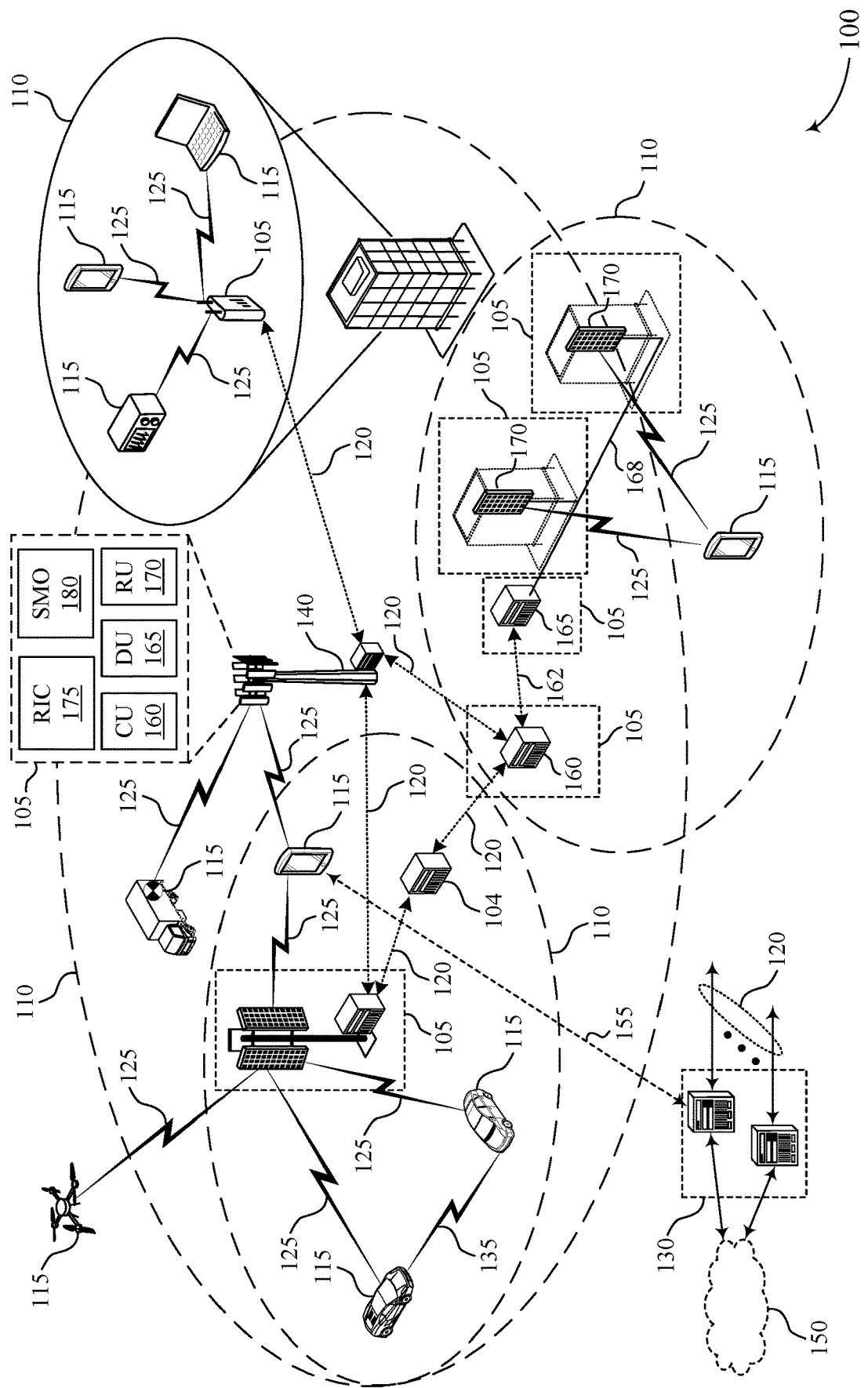
FIGS. 1, 2, and 3 show examples of wireless communications systems that support user equipment (UE) antenna module lock function for millimeter wave frequencies in accordance with one or more aspects of the present disclosure.

Wireless communications systems may undergo conformance testing which may evaluate the performance of devices and networks, including their ability to effectively transmit and receive signals and conform to various communications standards. To evaluate signaling performance, some processes may be used to test beamforming in network entities and user equipments (UEs) while the system is actively performing beam scanning and tracking. For example, a technique (e.g., implemented for fifth generation (5G) new radio (NR)) is the UE "beam lock" function, where a network entity or other network test equipment sends a beam lock command to effectively force a UE to lock the beamforming pattern of the UE to a single beam, which allows testing to occur (and allows performance metrics to be evaluated) for the single beam while a UE is manipulated over time (e.g., rotated by a positioner in an anechoic chamber). While the beam lock function may assist in identifying the performance of the beam selected by the UE, a UE may include multiple antenna modules, and the overall performance of the UE may be a cumulative performance metric of the UE over all of the individual antenna modules of the UE. With the beam lock functionality alone, the network may be unable to test the performance of a specific antenna module of the UE using these techniques, because beams from different antenna modules may be selected throughout the testing depending on the orientation of the UE, which may pose challenges for testing performance of devices having multiple antenna modules.

To support accurate performance testing, a wireless communications system may support UE antenna module lock functionality (UMF) which may enable a network to instruct a UE to utilize (e.g., test, communicate via) a single antenna module until the network deactivates the antenna module lock. During a testing procedure, the network may transmit a set of beam-swept synchronization signal blocks (SSBs) to the UE, which the UE may utilize in selecting a beam corresponding to a certain antenna module. The network may transmit an antenna module lock command to the UE which may instruct the UE to "lock" (e.g., not change) the antenna module of the UE. Upon the UE locking the antenna module, the network may transmit a beam lock command which may instruct the UE to lock the selected beam at the selected module. The UE may then perform several beam measurements under the antenna module lock and the beam lock, and may report the measurements to the network. The UE may then receive a beam lock deactivation to release or deactivate the beam lock. The UE may then be repositioned to another location and may select a different beam under the antenna module lock, and perform measurements for the different beam. The UE may move to several different locations (e.g., according to various orientations of the UE) while under the antenna module lock such that the UE may collect and report measurements to evaluate spherical coverage for the selected antenna module (e.g., and corresponding beam(s)). The UE may then receive an antenna module lock deactivation command from the network entity which may instruct the UE to release the UE antenna module lock. Upon releasing the antenna module lock, the UE (e.g., and the network) may repeat the process and continue to perform tests for other antenna modules.

Aspects of the disclosure are initially described in the context of wireless communications systems. Aspects of the disclosure are further illustrated by and described with reference to a process flow, apparatus diagrams, system diagrams, and flowcharts that relate to UE antenna module lock function for millimeter wave frequencies.

FIG. 1 shows an example of a wireless communications system 100 that supports UE antenna module lock function for millimeter wave frequencies in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UE module lock function for millimeter wave frequencies as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A wireless communications device such as a UE 115 or network entity 105 may utilize multiple antennas for communications within a millimeter wave system or other high frequency communications system, such as the wireless communications system 100. Beamforming from multiple antennas may, in some examples, bridge the link budget in systems that have high traffic and operate using high frequencies. To realize beamforming gains due to multiple antennas, an analog or hybrid beamforming codebook is constructed and is typically stored in the radio frequency integrated circuit (RFIC) memory of the devices.

In some implementations, the wireless communications systems may evaluate signaling performance of devices. For example, target performance of a UE 115 may be specified in terms of spherical coverage metrics associated with EIRP and EIS across different radio frequency spectrum bands. Spherical coverage may be assessed by computing a coverage cumulative distribution function (CDF), where a UE 115 may demonstrate more than a threshold percentage (e.g., x %) of a spherical coverage region will have EIRP and EIS performance that meets a minimum performance threshold. In some cases, the peak (e.g., maximum) and percentile requirements for EIRP and EIS are specified for UEs 115 (across different UE power classes) across different bands. For example, a UE that meets these EIRP and EIS requirements may be referred to as an "admissible UE" under a given power class. In some cases, the specified performance thresholds may be implemented by a wireless communications standard, or by different network operators, each of which may have the same or different admissible performance thresholds. In some examples, network operators may have different (e.g., more stringent) requirements to admit UEs 115 into the network.

Enhanced blockage tests may be implemented for estimating the performance of millimeter wave UEs 115 under practical deployment considerations, such as under various different possible blockage conditions. For example, one possible performance test may estimate EIRP under different hand phantom conditions, or different positions that a user may manually hold a UE 115 (and possibly block one or more antenna modules of the UE 115). There may also be various different kinds of blockage due to a high degree of flexibility in terms of electromagnetic properties of phantom materials, holding positions and measurement errors. To accurately measure performance under realistic conditions, EIRP may be measured under freespace conditions on a per-antenna module basis which can then be subsequently transformed using hand blockage models to produce EIRP under blockage conditions.

In some implementations, the wireless communications system 100 may support performance testing including a UE antenna module lock functionality (UMF). The antenna module lock may enable the network entity 105 (e.g., a testing device, a testing system) to instruct the UE 115 to utilize (e.g., test, communicate via) a single antenna module until the network entity 105 subsequently deactivates the antenna module lock. During a testing procedure, the network entity 105 may transmit a set of SSBs to the UE 115 as part of a beam sweep procedure, which the UE 115 may utilize in selecting a beam corresponding to a certain antenna module. The network entity 105 may transmit an antenna module lock command to the UE 115 to instruct the UE 115 to "lock" (e.g., not change) the antenna module of the UE 115. Upon the UE 115 locking the antenna module, the network entity 105 may transmit a beam lock command which may instruct the UE 115 to lock the selected beam at the selected antenna module. The UE 115 may then perform several performance measurements under the antenna module lock and the beam lock, and may report the measurements to the network entity 105. The UE 115 may then receive a beam lock deactivation to release or deactivate the beam lock. The UE 115 may then be repositioned according to a different orientation or a different directional plane, may perform another beam selection of a different beam, and may perform additional measurements under the antenna module lock. The UE 115 may move to several different locations (e.g., according to various orientations) while under the antenna module lock such that the UE 115 may collect and report measurements to evaluate spherical coverage for the selected antenna module (e.g., and corresponding beams). The UE 115 may then receive an antenna module lock deactivation command from the network entity 105 which may instruct the UE 115 to release the UE 115 antenna module lock. Upon releasing the antenna module lock, the UE 115 (e.g., and the network 105) may repeat the testing process to perform additional tests for other antenna modules of the UE 115.

Figure 2:
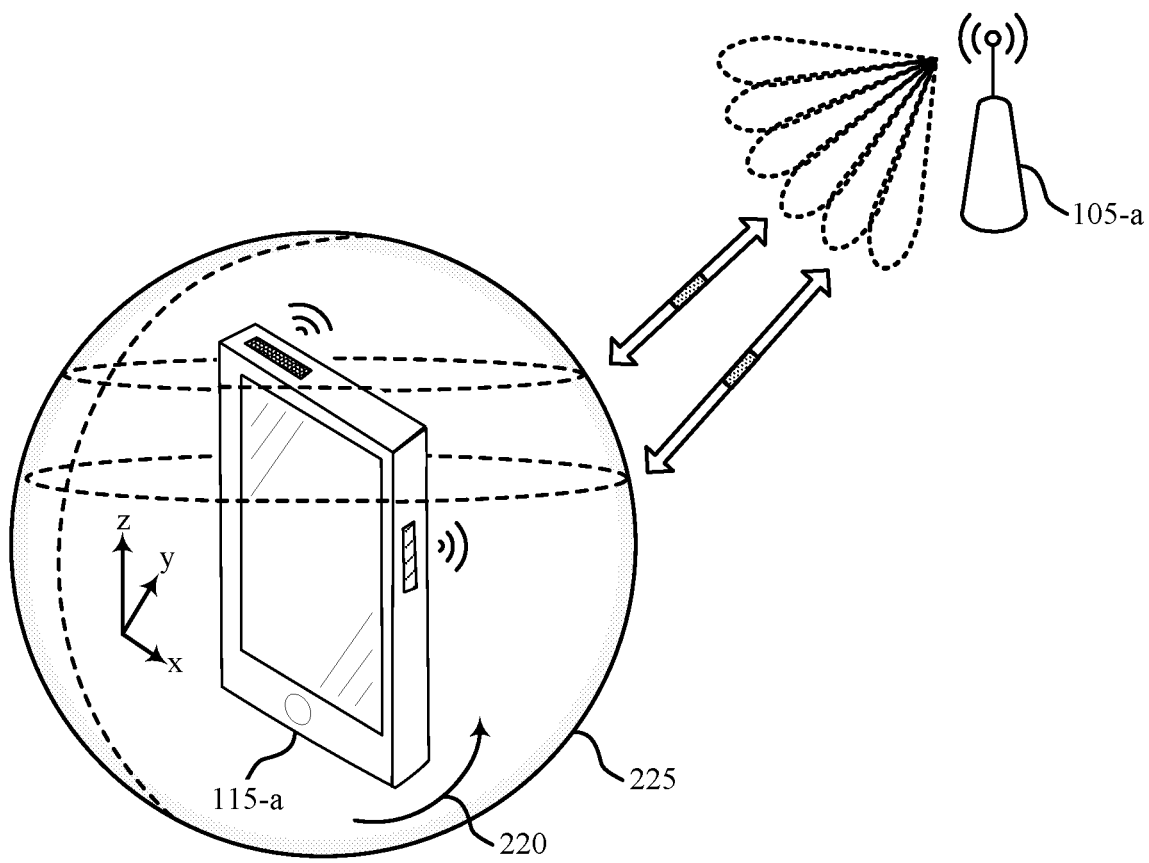

FIG. 2 shows an example of a wireless communications system 200 that supports UE antenna module lock function for millimeter wave frequencies in accordance with one or more aspects of the present disclosure. The wireless communications system 200 may implement aspects of the wireless communications system 100. For example, the wireless communications system 200 may include a network entity 105-a which may be an example of a network entity 105 as described with reference to FIG. 1, and both of which may be examples of testing equipment. The wireless communications system 200 may also include a UE 115-a that may be an example of a UE 115 as described with reference to FIG. 1.

The wireless communications system 200 may support different types of conformance testing, which may evaluate the performance of the UE 115-a and the network entity 105-a, including their ability to effectively transmit and receive signals and conform with various wireless communication standards. To evaluate signaling performance, the wireless communications system 200 may implement various testing procedures while the system is actively performing beam scanning and tracking. For example, one such testing procedure may include a "beam lock" functionality, which may allow the network entity 105-a to transmit a beam lock command that forces the UE 115-a to lock the beamforming pattern of the UE 115-a to a single beam such that testing may occur (and such that certain performance metrics may be evaluated) for the single locked beam.

The UE beam lock function may be implemented to evaluate different spherical coverage metrics associated with UE performance. In some cases, however, the overall performance of the UE 115-a may be a cumulative spherical performance metric of the UE 115-a over all of the individual antenna modules of the UE 115-a (e.g., over one or more antenna modules of the UE 115-a such as a first antenna module 205 and a second antenna module 210). While a cumulative spherical performance metric may indicate to the network entity 105-a whether the UE 115-a is (on average) performing above various thresholds (e.g., corresponding to effective isotropic radiated power (EIRP) and effective isotropic sensitivity (EIS) requirements, among others), the cumulative performance metric may not evaluate the performance of individual antenna modules of the UE 115-a. That is, the cumulative performance metrics may be skewed to represent the best performing antenna module, but may not be able to effectively identify any antenna modules that may be performing below a threshold performance metric. In order to evaluate the performance more granularly for each individual antenna module, the wireless communications system 200 may implement testing techniques to determine performance of each antenna module of the UE 115-*a*.

To support accurate performance testing, the wireless communications system 200 may support a UE antenna module lock function, which may enable the network entity 105-*a* to instruct the UE 115-*a* to utilize (e.g., test, communicate via) a single antenna module until the network entity 105-*a* subsequently deactivates the module lock. For example, during a testing procedure, the network entity 105-*a* may transmit one or more messages 215 to the UE 115-*a*. The one or more messages 215 may include a set of beam swept SSBs. The UE 115-*a* may perform beam selection using the SSBs, and may select a beam pair based on the beam pair having a highest relative reference signal receive power (RSRP) of all the beam swept SSBs. The selected beam pair may also correspond to a certain antenna module of the UE 115-*a* based on, for example, the relative position of the UE 115-*a* or other factors. For example, the UE 115-*a* may select a beam associated with the first antenna module 205. In some examples, the UE 115-*a* may indicate the selected beam pair to the network entity 105-*a*.

After initial beam selection, the network entity 105-*a* may transmit one or more other messages to the UE 115-*a* via the selected beam pair. For example, upon the UE 115-*a* selecting the beam corresponding to the first antenna module 205, the network entity 105-*a* may transmit an antenna module lock command (e.g., a UMF command) to the UE 115-*a*. The antenna module lock command may instruct the UE 115-*a* to "lock" (e.g., not change) the first antenna module 205. In response receiving the antenna module lock command, the UE 115-*a* may lock the first antenna module 205. The network entity 105-*a* may also transmit a beam lock command (e.g., a beam lock function (UBF) command) in one or more other messages. For example, the network entity 105-*a* may transmit, and the UE 115-*a* may receive, a beam lock command instructing the UE 115-*a* to lock (e.g., not change, not switch) the selected beam at the first antenna module 205, or to otherwise stop any active beam management at the UE 115-*a*. In some examples, the UE 115-*a* may refrain from performing beam switching in response to different channel conditions, channel fading, temporal conditions, or any combination thereof, in response to receiving the beam lock command.

The UE 115-*a* may then perform several performance measurements and communicate results with the network entity 105-*a*. For example, subsequent to locking the first antenna module 205 and locking the selected beam, the UE 115-*a* may perform various measurements for the selected beam at the first antenna module 205, including EIRP and EIS, among other conformance tests and spherical test metrics. In some examples, the measurements may include testing various characteristics of beams across different locations of the sphere 225 to evaluate a signal strength at the first antenna module 205. Upon completing the measurements, the UE 115-*a* may transmit the measurement results to the network entity 105-*a*.

In some examples, the UE 115-*a* may be in a field test mode, which may allow the UE 115-*a* to use both antenna module lock functionality and beam lock functionality in combination to cycle through all possible beam identifiers (IDs) at the UE 115-*a* over a serving antenna module for each position of the UE 115-*a*. For example, each position of the UE 115-*a* may correspond to a different angle over a spherical coverage region located around the UE 115-*a* (e.g., the device under test). The EIRP and/or EIS measurements (corresponding to receiver side automatic gain control (AGC)) that correspond to each position of the sphere 225 may be collected to evaluate a complete performance metric for the UE 115-*a*.

After performing the measurements for the selected beam, the UE 115-*a* may be repositioned for one or more other measurements. For example, the UE 115-*a* may be moved to a different location within a testing area such that additional measurements may be performed for the antenna module 205. In such cases, the network entity 105-*a* may respond to the received measurements by transmitting a beam lock deactivation (e.g., release) command to the UE 115-*a* to release the first selected beam, while retaining the antenna module lock on the first antenna module 205 in the different location. The UE 115-*a* may move to one or more different locations (e.g., according to various orientations) during the repositioning operation 220, where the UE 115-*a* may move in one or more lateral directions, may rotate about one or more axes or angles, or a combination thereof. After repositioning, and while the antenna module lock for the antenna module 205 remains activated, the UE 115-*a* may select a different beam, receive a second beam lock for the different beam, and may take one or more measurements for the different beam to evaluate spherical coverage for the first antenna module 205 (e.g., and corresponding beam(s)). The UE 115-*a* may continue to perform measurements using the described process for the first antenna module 205 until the UE 115-*a* obtains a full spherical coverage metric of EIRP, EIS, or both, at the first antenna module (e.g., the UE 115-*a* may use the measurements to plot a CDF for EIRP and EIS of the first antenna module 205).

The UE 115-*a* may then perform one or more measurements (e.g., repeat the process) for another antenna module (e.g., the second antenna module 210). For example, the network entity 105-*a* may transmit one or more other messages 215 to the UE 115-*a* instructing the UE to deactivate the antenna module lock on the first antenna module 205. The UE 115-*a* may then be repositioned such that the UE 115-*a* selects a beam pair corresponding to the second antenna module 210. The network entity 105-*a* may then transmit a second module lock command for the UE 115-*a* to lock the second antenna module 210. The network entity 105-*a* and the UE 115-*a* may then repeat the processes (e.g., the locking and unlocking of beams for the second antenna module 210, beam lock deactivations and activations at the second antenna module 210) so that the UE 115-*a* can evaluate the performance of the second antenna module 210 and overall spherical performance during the antenna module lock activation of the second antenna module 210.

Figure 3:
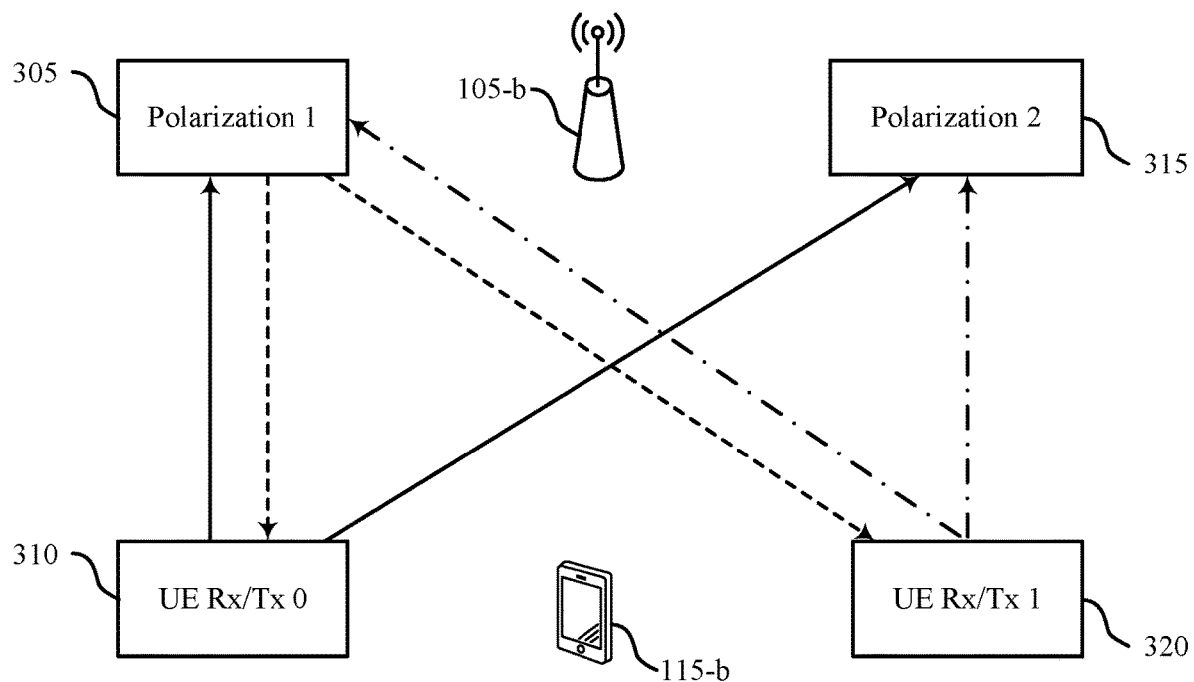

FIG. 3 shows an example of a wireless communications system 300 that supports UE antenna module lock function for millimeter wave frequencies in accordance with one or more aspects of the present disclosure. The wireless communications system 300 may implement aspects of the wireless communications system 100 and the wireless communications system 200. For example, the wireless communications system 300 may include a network entity 105-*b* that may be an example of a network entity 105 or a network entity 105-*a* as described with reference to FIGS. 1 and 2, respectively.

The network entity 105-*b* may include a first polarization 305 (e.g., polarization 1) and a second polarization 315 (e.g., polarization 2). The wireless communications system 300 may also include a UE 115-*a* that may be an example of a UE 115 or a UE 115-*a* as described with reference to FIGS. 1 and 2, respectively. The UE 115-*b* may also include one or more polarizations for transmitting and receiving communications. For example, the UE 115-*b* may include a first UE polarization 310 (e.g., UE Rx/Tx 0) and a second UE polarization 320 (e.g., UE Rx/Tx 1). In some examples, the UE 115-*b* and the network entity 105-*b* may perform different communications via different communication links in the wireless communications system. For example, the UE 115-*b* may use a first set of links to perform beam selection, a second set of links for uplink communications, and a third set of links for transmit antenna diversity (TAV) application and for cyclic delay diversity (CDD).

The wireless communications system 300 may perform a beam selection operation. For example, the network entity 105-*b* may one or more SSBs via the first polarization 305 to the first UE polarization 310 and the second UE polarization 320 of the UE 115-*b*. The UE 115-*b* may receive the one or more SSBs, and may perform a beam selection for a set of receive beams across a plurality of antenna modules of the UE 115-*b* to select a first beam pair (e.g., a UE receive beam and a network entity transmit beam) associated with a first antenna module of the UE 115-*b*. In some examples, the UE 115-*b* may select the beam pair based on a detected (e.g., measured) average RSRP of the beams.

The network entity 105-*b* may wait a quantity of time (e.g., 3 seconds) for the UE 115-*b* to perform the beam selection operation or for beam selection to converge at the UE 115-*b*, and then may transmit (e.g., from the first polarization 305 to the first UE polarization 310 and the second UE polarization 320 of the UE 115-*b*) one or more control messages including one or more antenna module lock activation commands (e.g., an "activate antenna module lock" message) and one or more beam lock activation commands (e.g., an "activate beam lock" message). The UE 115-*b* may receive the module lock activation command, and may lock (e.g., not change, not switch) the first antenna module of the UE 115-*b*. The UE 115-*b* may receive the beam lock activation command, and may lock the beam pair (e.g., not change, not switch) the selected beam pair. In some examples, the antenna module lock function, the beam lock function, or both, may apply to the UE transmitter and UE receiver beams either simultaneously or independently.

Upon performing the antenna module lock and the beam lock operations, the UE 115-*b* may perform various measurements on the selected beam pair. In some examples, the UE 115-*b* may test various conformance parameters of the beam pair, such as EIRP and EIS conformance, among other parameters. In some examples, the network entity 105-*b* may transmit an uplink grant to the UE 115-*b* after sending the module lock and beam lock commands. The UE 115-*b* may respond to the UL grant command using the selected beam pair (e.g., the locked beam pair) by transmitting to the first polarization 305 and to the second polarization 315. The network entity 105-*b* may measure various parameters associated with the received transmissions of the UE 115-*b*. For example, the network entity 105-*b* may receive EIRP for the UE 115-*b* at the selected beam pair for a duration of time (e.g., 1 ms). In such examples, the EIRP of the UE 115-*b* may be measured on both polarizations of the network entity 105-*b*, and may be measured for the selected beam pair at one or more angles or orientations (e.g., theta, phi, link polarization).

In some examples, the UE 115-*b* may perform one or more other measurements for a second beam pair under the antenna module lock. For example, the network entity 105-*b* may transmit a beam lock deactivation command (e.g., from the first polarization 305 to the first UE polarization 310 and the second UE polarization 320 of the UE 115-*b*) instructing the UE 115-*b* to release the beam lock for the first beam pair. The UE 115-*b* may receive the beam lock deactivation command, and may release the beam lock on the selected beam pair while keeping the antenna module lock on the first antenna module active. The UE 115-*b* may move to a new location or according to a new orientation in relation to the network entity 105-*b*. For example, in response to releasing the beam lock on the first beam lock pair, the UE 115-*b* may rotate such that the first antenna module may face a different direction than the direction associated with the first measurements. The UE 115-*b* may subsequently select a second beam pair associated with the first antenna module of the UE 115-*b* (e.g., along the new direction, along the new plane and between the UE 115-*b* and the network entity 105-*b*). The network entity 105-*b* may transmit a second beam lock command instructing the UE 115-*b* to lock (e.g., not change, not switch) the second selected beam pair and perform one or more other measurements on the second beam pair. The UE 115-*b*, in response to receiving the second beam lock command, may lock the second beam pair. The UE 115-*b* may perform various measurements on the second beam pair, using a similar or identical method described herein for the measurements performed on the first beam pair, such that performance metrics (e.g., EIRP) is measured for the second beam pair. In some examples, the wireless communications system 300 may continue to repeat this process until a quantity of measurements have been performed for at least a threshold quantity of beams associated with the first antenna module of the UE 115-*b* (e.g., in a round robin manner). In some examples, the measurements may be performed for various different orientations or relative spatial locations of the UE 115-*b*, or based on various different possible blockage scenarios (e.g., different possible handholding positions of the UE 115-*b* or other antenna blockage scenarios).

Upon completion of testing for the first antenna module, the network entity 105-*b* and the UE 115-*b* may deactivate the beam lock and the module lock associated with the first antenna module. For example, the network entity 105-*b* may transmit a second beam lock deactivation command instructing the UE 115-*b* to release the lock on the second beam pair. The UE 115-*b* may receive the second beam lock deactivation command, and may release the beam lock on the second beam pair. The network entity 105-*b* may also transmit a module lock deactivation command instructing the UE 115-*b* to release the lock on the first antenna module. The UE 115-*b* may, in response to receiving the module lock deactivation command, release the module lock on the first antenna module. In some examples, the beam lock deactivation and the module lock deactivation may apply to the UE transmitter and the UE receiver beams either simultaneously or independently. In some examples, the wireless communications system 300 may repeat the process on one or more other antenna modules of the UE 115-*b* (e.g., a second antenna module) from the perspective of the first polarization 305.

The wireless communications system 300 may repeat various process steps via the second polarization 315. For example, the UE 115-*b* may move to a new orientation in relation to the network entity 105-*b*. The network entity 105-*b* may send one or more SSBs during a beam sweep via the second polarization 315 to the first UE polarization 310 and the second UE polarization 320 of the UE 115-*b*. The UE 115-*b* may be an SSB, and may perform a beam selection across a plurality of antenna modules of the UE 115-*b* to select a third beam pair associated with a third antenna module of the UE 115-*b*. In some examples, the UE 115-*b* may select the beam pair based on a detected (e.g., measured) average RSRP of the beams.

The network entity 105-*b* may wait a quantity of time (e.g., 3 seconds) for the UE 115-*b* to perform the third beam selection operation or for beam selection to converge at the UE 115-*b*, and then may transmit (e.g., from the second polarization 315 to the first UE polarization 310 and the second UE polarization 320 of the UE 115-*b*) one or more control messages including one or more second module lock activation commands (e.g., an "activate module lock" message) and one or more third beam lock activation commands (e.g., an "activate beam lock" message). The UE 115-*b* may receive the second module lock activation command, and may lock (e.g., not change, not switch) the third antenna module of the UE 115-*b*. The UE 115-*b* may receive the third beam lock activation command, and may lock the third beam pair (e.g., not change, not switch) the selected beam pair.

Upon performing the module lock and the beam lock operations, the UE 115-*b* may perform various measurements on the selected, third beam pair. In some examples, the UE 115-*b* may test various conformance parameters of the beam pair, such as EIRP and EIS conformance, among other parameters. In some examples, the network entity 105-*b* may transmit an uplink grant to the UE 115-*b* after sending the module lock and beam lock commands. The UE 115-*b* may respond to the UL grant command using the selected beam pair (e.g., the locked beam pair) by transmitting to the first polarization 305 and to the second polarization 315, and the network entity 105-*b* may measure various parameters associated with the received transmissions of the UE 115-*b*. For example, the network entity 105-*b* may receive EIRP for the UE 115-*b* at the selected beam pair for a duration of time (e.g., 1 ms). In such examples, the EIRP of the UE 115-*b* may be measured on both polarizations of the network entity 105-*b*, and may be measured for the selected beam pair at one or more angles or orientations (e.g., theta, phi, link polarization).

In some examples, the UE 115-*b* may perform one or more other measurements for a fourth beam pair under the module lock. For example, the network entity 105-*b* may transmit a beam lock deactivation command (e.g., from the second polarization 315 to the first UE polarization 310 and the second UE polarization 320 of the UE 115-*b*) instructing the UE 115-*b* to release the beam lock on the third beam pair. The UE 115-*b* may receive the third beam lock deactivation command, and may release the beam lock on the selected beam pair while keeping the module lock on the third antenna module active. The UE 115-*b* may move to a new location or according to a new orientation in relation to the network entity 105-*b*. For example, in response to releasing the beam lock on the third beam pair, the UE 115-*b* may rotate such that the third antenna module may face a different direction than the direction associated with the measurements of the third beam pair. The UE 115-*b* may subsequently select a fourth beam pair associated with the third antenna module of the UE 115-*b* (e.g., along the new direction, along the new plane and between the UE 115-*b* and the network entity 105-*b*). The network entity 105-*b* may transmit a fourth beam lock command instructing the UE 115-*b* to lock (e.g., not change, not switch) the fourth selected beam pair and perform one or more other measurements on the fourth beam pair. The UE 115-*b*, in response to receiving the fourth beam lock command, may lock the fourth beam pair and perform various measurements on the fourth beam pair, in a similar fashion as the measurements performed on the previous beam pairs, such that performance metrics (e.g., EIRP) is measured for the fourth beam pair. In some examples, the wireless communications system 300 may continue to repeat this process until a quantity of measurements have been performed for all beams associated with the third antenna module of the UE 115-*b* (e.g., in a round robin manner).

Upon completion of testing for the third antenna module, the network entity 105-*b* and the UE 115-*b* may deactivate the beam lock and the module lock associated with the third antenna module. For example, the network entity 105-*b* may transmit a fourth beam lock deactivation command instructing the UE 115-*b* to release the lock on the fourth beam pair. The UE 115-*b* may receive the fourth beam lock deactivation command, and may release the beam lock on the fourth beam pair. The network entity 105-*b* may also transmit a module lock deactivation command instructing the UE 115-*b* to release the module lock on the third antenna module. The UE 115-*b* may, in response to receiving the module lock deactivation command, release the lock on the first antenna module. In some examples, the wireless communications system 300 may repeat the process on one or more other antenna modules of the UE 115-*b* (e.g., a fifth antenna module) from the perspective of the second polarization 315.

Figure 4:
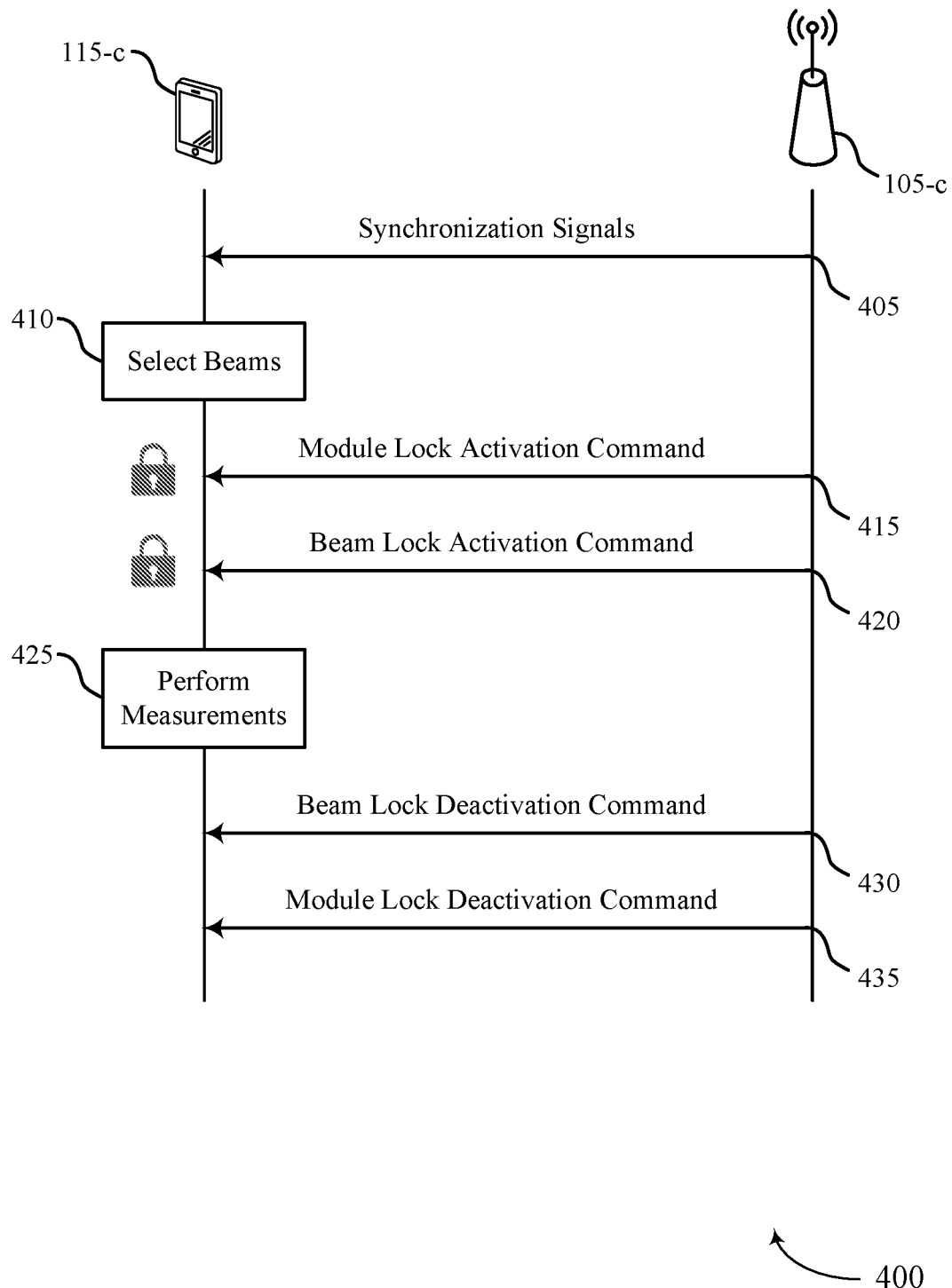
FIG. 4 shows an example of a process flow that supports UE antenna module lock function for millimeter wave frequencies in accordance with one or more aspects of the present disclosure.

FIG. 4 shows an example of a process flow 400 that supports UE module lock function for millimeter wave frequencies in accordance with one or more aspects of the present disclosure. The process flow 400 may implement or be implemented by one or more aspects of the wireless communications system 100 or the wireless communications system 200. For example, the process flow 400 may include (e.g., be implemented by) a network entity 105-*c* that may be an example of a network entity 105, network entity 105-*a*, or a network entity 105-*b* as described with reference to FIGS. 1 through 3. The process flow 400 may also include (e.g., be implemented by) a UE 115-*c* that may be an example of a UE 115, a UE 115-*a*, or a UE 115-*b* as described with reference to FIGS. 1 through 3.

In the following description of process flow 400, the operations may be performed in a different order than the order shown, or other operations may be added or removed from the process flow 400. For example, some operations may also be left out of process flow 400, may be performed in different orders or at different times, or other operations may be added to process flow 400. Although communications of the process flow 400 are shown occurring between a UE 115-*c* and a network entity 105-*c*, some aspects of some operations may also be performed by one or more other wireless devices, network devices, or network functions.

At 405, the network entity 105-*c* may transmit, and the UE 115-*c* may receive, one or more beam-swept synchronization signals (e.g., SSBs) associated with a testing procedure for the UE 115-*c*. In the case that the UE 115-*c* may be configured in a field test mode, the testing procedure may include a conformance testing procedure for the UE 115-*c*. The network entity 105-*c* may transmit the one or more beam-swept synchronization signals to the UE 115-*c* in accordance with (e.g., via) a first polarization state of the network entity 105-*c*.

At 410, the UE 115-*c* may select a first beam pair. For example, the UE 115-*b* may select a first beam pair from a quantity of beams associated with the received beam-swept synchronization signals. The UE 115-*b* may select the first beam pair based on the first beam pair including a highest average RSRP relative to the quantity of beams associated with the received beam-swept synchronization signals. The first beam pair may be associated with (e.g., correspond to) a first antenna module of the UE 115-*c*. In some examples, the first antenna module of the UE 115-*c* may be associated with a first antenna polarization of the UE 115-c. In some examples, each beam pair of the quantity of beams may be associated with a different location of the UE 115-c relative to the network entity 105-c, a different orientations of the UE 115-c relative to the network entity 105-c, or a combination thereof.

At 415 the network entity 105-c may transmit, and the UE 115-c may receive, a first module lock command. For example, the UE 115-c may transmit, and the network entity 105-c may receive, an indication of the first beam pair. In response to receiving the indication of the first beam pair, the network entity 105-c may transmit the first module lock command. The first module lock command may enable a module lock function at the UE 115-c which may prevent the UE 115-c from switching from the first antenna module to a second antenna module. The first module lock command may also include instructions instructing the UE 115-c to perform communications with the network entity 105-c utilizing the first antenna module of the UE 115-c for a quantity of time (e.g., a duration) corresponding to a quantity of time the first module lock command may be activated.

At 420, the network entity 105-c may transmit, and the UE 115-c may receive, a first beam lock command. The first beam lock command may include instructions instructing the UE 115-c to perform communications with the network entity 105-c via the first beam pair for a quantity of time equal to a quantity of time associated with the activation of the first beam lock command.

At 425, the UE 115-c may perform a first set of measurements. For example, the UE 115-c may perform the first set of measurements of the first beam pair at the first antenna module in response to receiving the first module lock command and the first beam lock command. The first set of measurements for the first beam pair may include one or more spherical coverage metrics of the UE 115-c, such as an EIRP parameter, an EIS parameter, or a combination of both. The UE 115-c may perform the first set of measurements while located at a first location or a first orientation relative the network entity 105-c. In some examples, the network entity 105-c may transmit, and the UE 115-c may receive, an uplink grant that includes a request for the first set of measurements associated with the first beam pair. In response to receiving the UL grant, the UE 115-c may transmit one or more messages to the network entity 105-c, which may include an indication of the first set of measurements.

At 430 the network entity 105-c may transmit, and the UE 115-c may receive, a first beam lock deactivation command. The first beam lock deactivation command may include instructions instructing the UE 115-c to release the first beam lock of the first beam pair. In response to receiving the first beam lock deactivation command, the UE 115-c may release the first beam lock associated with the first beam pair.

In some examples, the UE 115-c may perform one or more second measurements. For example, the UE 115-c may select a second beam pair from the quantity of beam pairs. The second beam pair may be associated with the first antenna module of the UE 115-c. The network entity 105-c may transmit, and the UE 115-c may receive, a second beam lock command including instructions instructing the UE 115-c to perform communications with the network entity 105-c utilizing the second beam pair for the duration of the second beam lock command. The UE 115-c may perform a second set of measurements for a second beam pair based on the first module lock command and the second beam lock command. In the case that the UE 115-c may perform a second set of measurements, the UE 115-c may be located at a second location or orientation relative to the network entity 105-c. The network entity 105-c may transmit, and the UE 115-c may receive, a second beam deactivation command including instructions instructing the UE 115-c to release the second beam lock command of the second beam pair. The UE 115-c may perform one or more other measurements for one or more other beam pairs selected by the UE 115-c subsequent to receiving the second beam deactivation command.

At 435, the network entity 105-c may transmit, and the UE 115-c may receive, a first module lock deactivation command. The first module deactivation command may include instructions instructing the UE 115-c the release the first module lock associated with the first antenna module. The UE 115-c may release the first module lock in response to receiving the first module deactivation command.

In some examples, the UE 115-c may perform a third set of measurements associated with a second antenna module lock command received from the network entity 105-c. In the case that the UE 115-c may perform the third set of measurements subsequent to transmitting the first module lock deactivation command and the first beam lock deactivation command.

Figure 5:
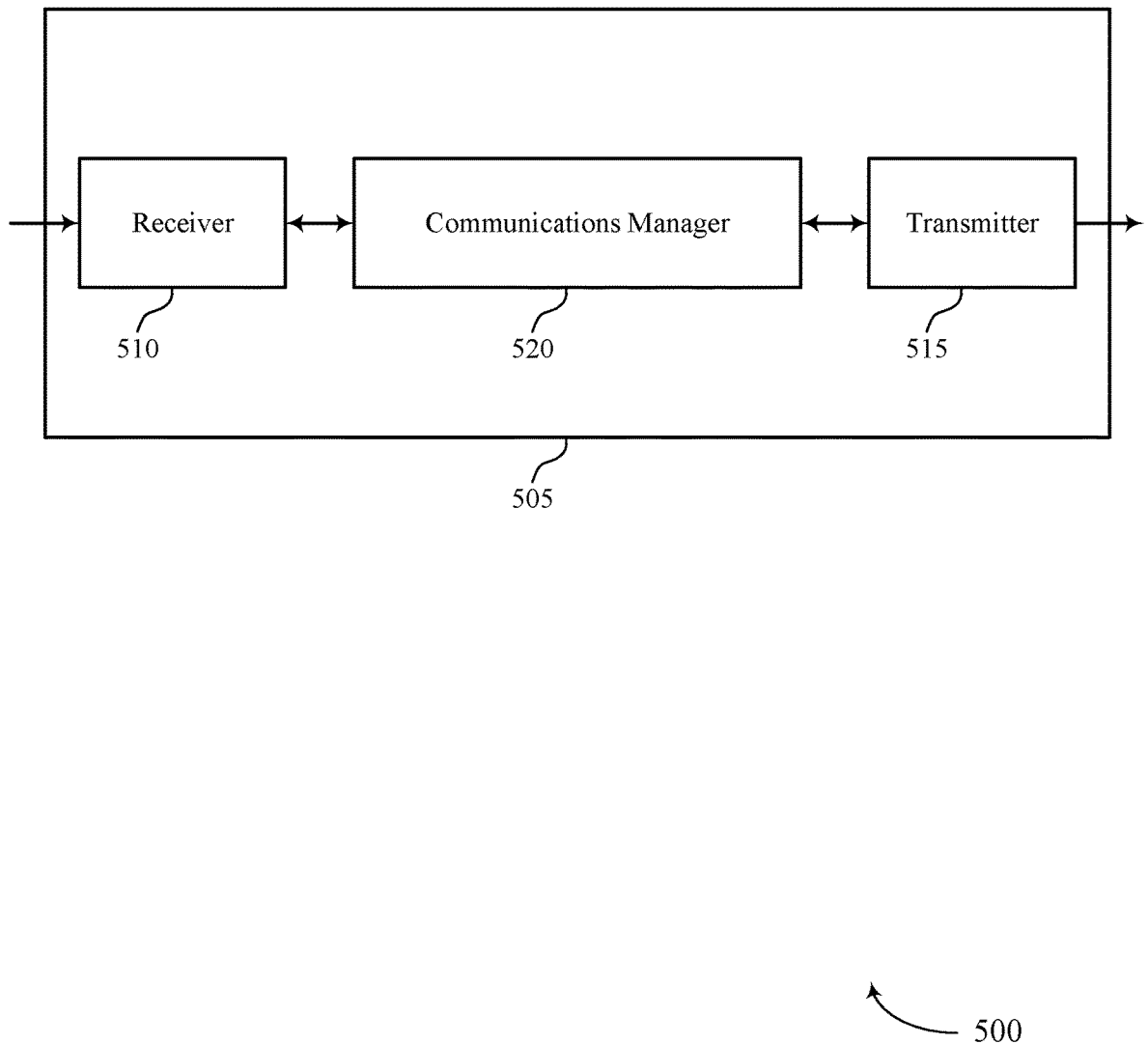
FIGS. 5 and 6 show block diagrams of devices that support UE antenna module lock function for millimeter wave frequencies in accordance with one or more aspects of the present disclosure.

FIG. 5 shows a block diagram 500 of a device 505 that supports UE module lock function for millimeter wave frequencies in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to UE module lock function for millimeter wave frequencies). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE module lock function for millimeter wave frequencies). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE module lock function for millimeter wave frequencies as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in hardware, software (e.g., executed by at least one processor), or any combination thereof. If implemented in code executed by at least one processor, the functions of the communications manager 520, the receiver 510, the transmitter 515, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving, from a network entity, a set of multiple beam-swept synchronization signals associated with a testing procedure for the UE. The communications manager 520 is capable of, configured to, or operable to support a means for selecting a first beam pair from a set of multiple beam pairs associated with the set of multiple beam-swept synchronization signals, where the first beam pair corresponds to a first antenna module of the UE. The communications manager 520 is capable of, configured to, or operable to support a means for receiving, from the network entity, a first module lock command including instructions for the UE to perform communications with the first antenna module for a duration of the first module lock command. The communications manager 520 is capable of, configured to, or operable to support a means for receiving, from the network entity, a first beam lock command including instructions for the UE to perform communications with the first beam pair for a duration of the first beam lock command. The communications manager 520 is capable of, configured to, or operable to support a means for performing a first set of measurements of the first beam pair at the first antenna module in accordance with the first module lock command and the first beam lock command. The communications manager 520 is capable of, configured to, or operable to support a means for receiving, from the network entity, a first beam lock deactivation command including instructions to release the first beam lock command of the first beam pair. The communications manager 520 is capable of, configured to, or operable to support a means for receiving, from the network entity, a first module lock deactivation command including instructions to release the first module lock command of the first antenna module.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, more efficient utilization of communication resources.

Figure 6:
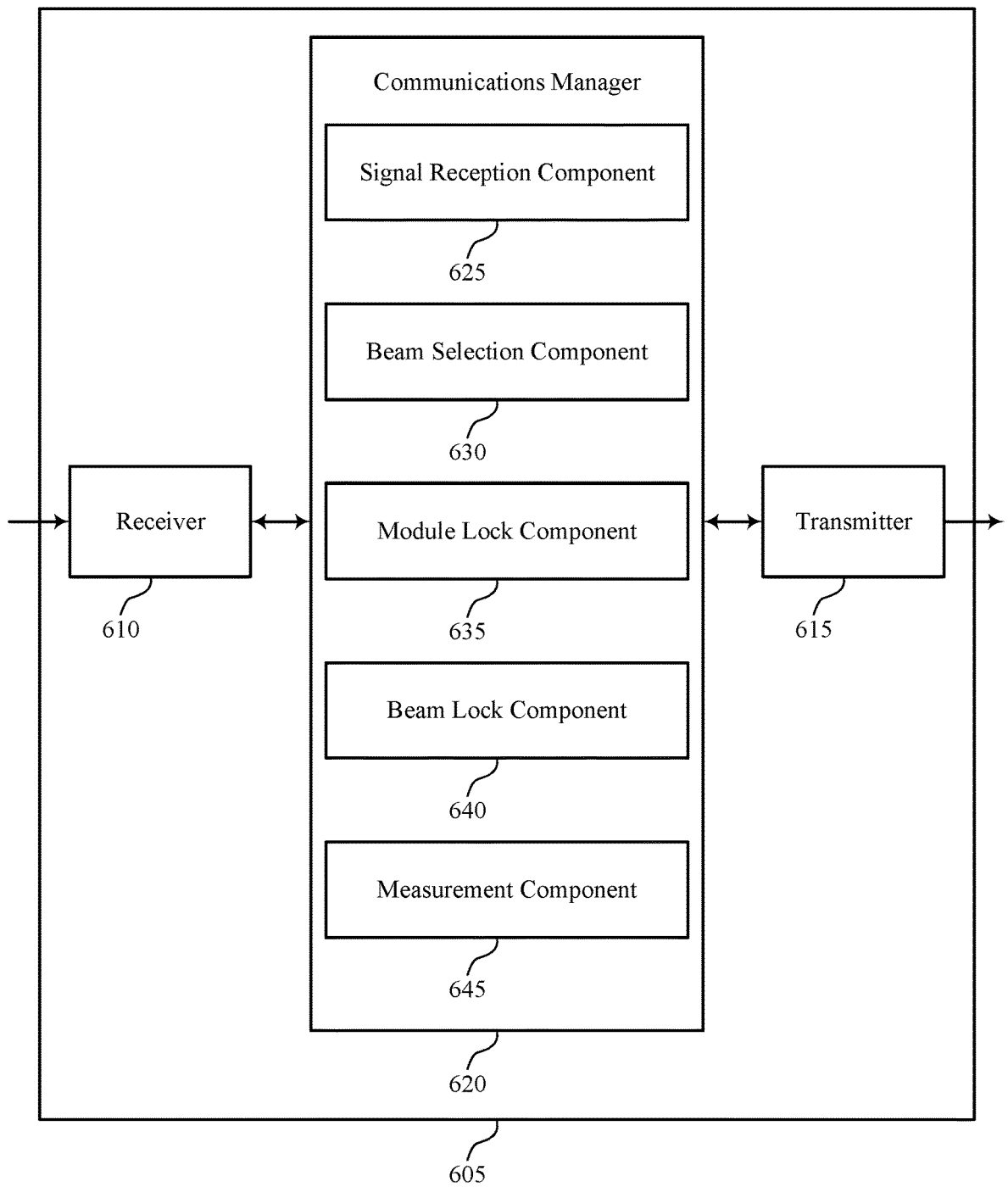

FIG. 6 shows a block diagram 600 of a device 605 that supports UE module lock function for millimeter wave frequencies in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to UE module lock function for millimeter wave frequencies). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE module lock function for millimeter wave frequencies). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE module lock function for millimeter wave frequencies as described herein. For example, the communications manager 620 may include a signal reception component 625, a beam selection component 630, a module lock component 635, a beam lock component 640, a measurement component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The signal reception component 625 is capable of, configured to, or operable to support a means for receiving, from a network entity, a set of multiple beam-swept synchronization signals associated with a testing procedure for the UE. The beam selection component 630 is capable of, configured to, or operable to support a means for selecting a first beam pair from a set of multiple beam pairs associated with the set of multiple beam-swept synchronization signals, where the first beam pair corresponds to a first antenna module of the UE. The module lock component 635 is capable of, configured to, or operable to support a means for receiving, from the network entity, a first module lock command including instructions for the UE to perform communications with the first antenna module for a duration of the first module lock command. The beam lock component 640 is capable of, configured to, or operable to support a means for receiving, from the network entity, a first beam lock command including instructions for the UE to perform communications with the first beam pair for a duration of the first beam lock command. The measurement component 645 is capable of, configured to, or operable to support a means for performing a first set of measurements of the first beam pair at the first antenna module in accordance with the first module lock command and the first beam lock command. The beam lock component 640 is capable of, configured to, or operable to support a means for receiving, from the network entity, a first beam lock deactivation command including instructions to release the first beam lock command of the first beam pair. The module lock component 635 is capable of, configured to, or operable to support a means for receiving, from the network entity, a first module lock deactivation command including instructions to release the first module lock command of the first antenna module.

Figure 7:
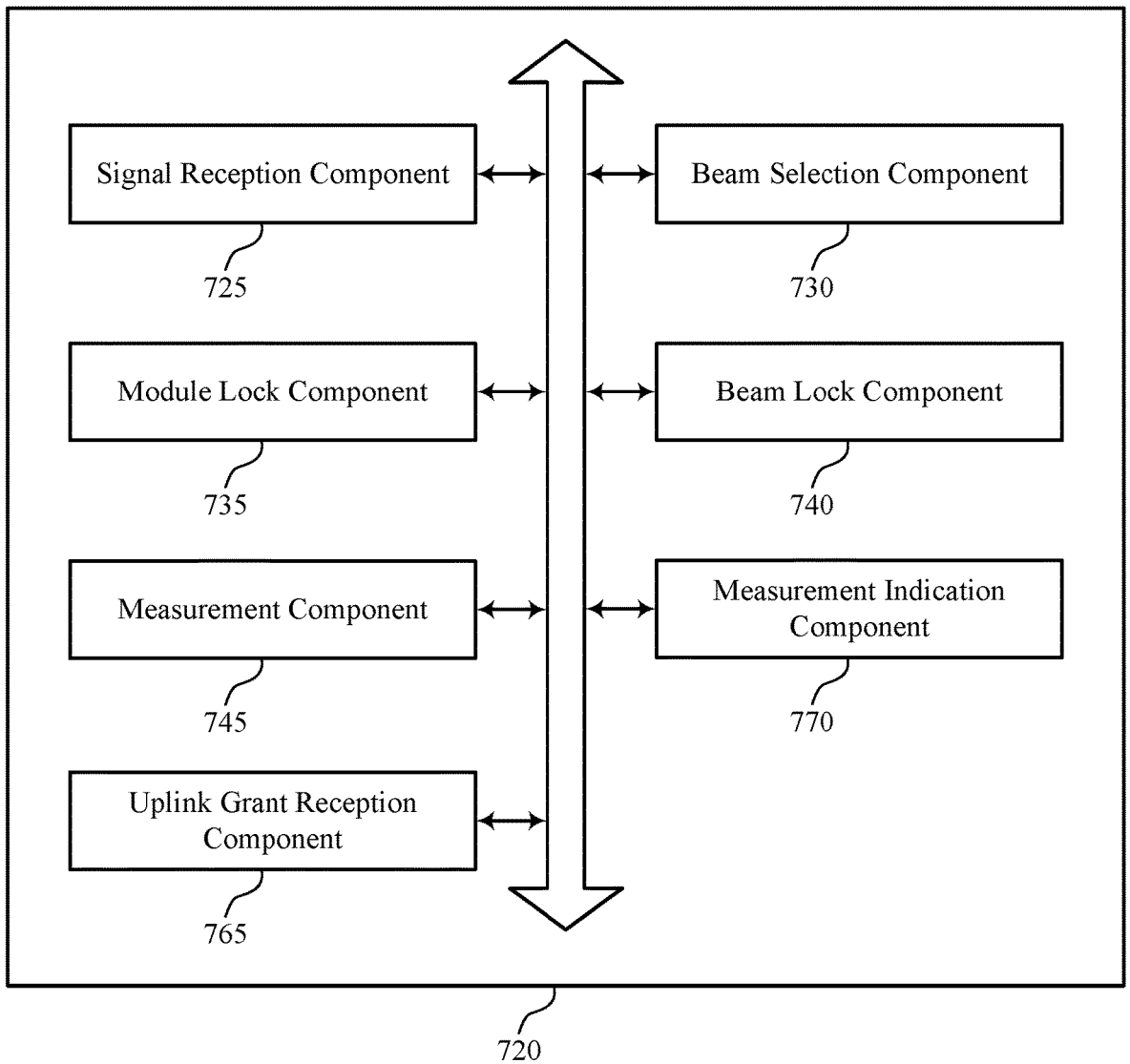
FIG. 7 shows a block diagram of a communications manager that supports UE antenna module lock function for millimeter wave frequencies in accordance with one or more aspects of the present disclosure.

FIG. 7 shows a block diagram 700 of a communications manager 720 that supports UE module lock function for millimeter wave frequencies in accordance with one or more aspects of the present disclosure. The communications manager 720 may be an example of aspects of a communications manager 520, a communications manager 620, or both, as described herein. The communications manager 720, or various components thereof, may be an example of means for performing various aspects of UE module lock function for millimeter wave frequencies as described herein. For example, the communications manager 720 may include a signal reception component 725, a beam selection component 730, a module lock component 735, a beam lock component 740, a measurement component 745, an uplink grant reception component 765, a measurement indication component 770, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The signal reception component 725 is capable of, configured to, or operable to support a means for receiving, from a network entity, a set of multiple beam-swept synchronization signals associated with a testing procedure for the UE. The beam selection component 730 is capable of, configured to, or operable to support a means for selecting a first beam pair from a set of multiple beam pairs associated with the set of multiple beam-swept synchronization signals, where the first beam pair corresponds to a first antenna module of the UE. The module lock component 735 is capable of, configured to, or operable to support a means for receiving, from the network entity, a first module lock command including instructions for the UE to perform communications with the first antenna module for a duration of the first module lock command. The beam lock component 740 is capable of, configured to, or operable to support a means for receiving, from the network entity, a first beam lock command including instructions for the UE to perform communications with the first beam pair for a duration of the first beam lock command. The measurement component 745 is capable of, configured to, or operable to support a means for performing a first set of measurements of the first beam pair at the first antenna module in accordance with the first module lock command and the first beam lock command. The beam lock component 740 is capable of, configured to, or operable to support a means for receiving, from the network entity, a first beam lock deactivation command including instructions to release the first beam lock command of the first beam pair. The module lock component 735 is capable of, configured to, or operable to support a means for receiving, from the network entity, a first module lock deactivation command including instructions to release the first module lock command of the first antenna module.

In some examples, the beam selection component 730 is capable of, configured to, or operable to support a means for selecting, prior to receiving the first module lock deactivation command, a second beam pair from the set of multiple beam pairs, where the second beam pair corresponds to the first antenna module of the UE. In some examples, the beam lock component 740 is capable of, configured to, or operable to support a means for receiving, from the network entity, a second beam lock command including instructions for the UE to perform communications with the second beam pair for a duration of the second beam lock command. In some examples, the measurement component 745 is capable of, configured to, or operable to support a means for performing a second set of measurements of the second beam pair at the first antenna module in accordance with the first module lock command and the second beam lock command. In some examples, the beam lock component 740 is capable of, configured to, or operable to support a means for receiving, from the network entity, a second beam lock deactivation command including instructions to release the second beam lock command of the second beam pair.

In some examples, the first module lock command enables a module lock function at the UE, and the module lock component 735 is capable of, configured to, or operable to support a means for refraining from switching from the first antenna module to a second antenna module in accordance with the module lock function.

In some examples, to support performing the first set of measurements of the first beam pair at the first antenna module, the uplink grant reception component 765 is capable of, configured to, or operable to support a means for receiving, from the network entity, an uplink grant including a request for the first set of measurements of the first beam pair. In some examples, to support performing the first set of measurements of the first beam pair at the first antenna module, the measurement indication component 770 is capable of, configured to, or operable to support a means for transmitting, in accordance with the uplink grant, an indication of the first set of measurements.

In some examples, to support performing the first set of measurements, the measurement component 745 is capable of, configured to, or operable to support a means for performing the first set of measurements at the UE, where the UE is at a first relative location or relative orientation. In some examples, to support performing the first set of measurements, the measurement component 745 is capable of, configured to, or operable to support a means for performing, prior to receiving the first module lock deactivation command, a second set of measurements for a second beam pair at the UE, where the UE is at a second relative location or second relative orientation.

In some examples, the measurement component 745 is capable of, configured to, or operable to support a means for performing, prior to receiving the first module lock deactivation command, a set of multiple measurements for a set of multiple different beam pairs selected by the UE.

In some examples, each beam pair of the set of multiple beam pairs correspond to different relative locations of the UE, different relative orientations of the UE, or both.

In some examples, the measurement component 745 is capable of, configured to, or operable to support a means for performing a second set of measurements for a second antenna module in accordance with a second antenna module lock command, where the UE receives the first module lock deactivation command and the first beam lock deactivation command prior to performing the second set of measurements.

In some examples, the first antenna module corresponds to a first antenna polarization. In some examples, the testing procedure includes a conformance testing procedure for the UE. In some examples, the UE is configured in a field test mode.

In some examples, to support selecting the first beam pair, the beam selection component 730 is capable of, configured to, or operable to support a means for selecting the first beam pair based on the first beam pair having a relative highest average reference signal receive power of the set of multiple beam pairs.

In some examples, the first set of measurements for the first beam pair include one or more spherical coverage metrics of the UE, including at least an effective isotropic radiated power, an effective isotropic sensitivity, or both.

Figure 8:
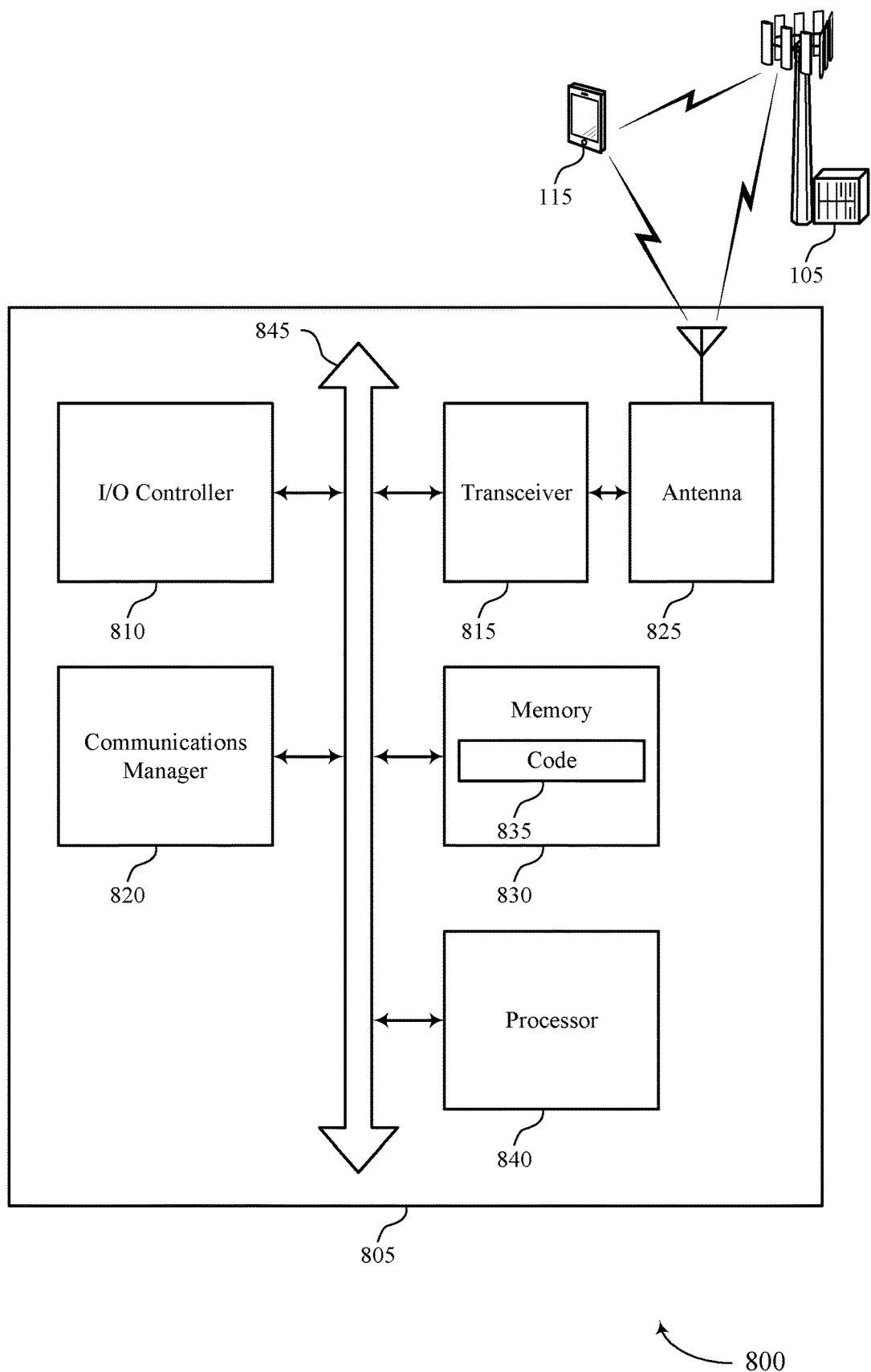
FIG. 8 shows a diagram of a system including a device that supports UE antenna module lock function for millimeter wave frequencies in accordance with one or more aspects of the present disclosure.

FIG. 8 shows a diagram of a system 800 including a device 805 that supports UE module lock function for millimeter wave frequencies in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bidirectional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a GPU, an NPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting UE module lock function for millimeter wave frequencies). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving, from a network entity, a set of multiple beam-swept synchronization signals associated with a testing procedure for the UE. The communications manager 820 is capable of, configured to, or operable to support a means for selecting a first beam pair from a set of multiple beam pairs associated with the set of multiple beam-swept synchronization signals, where the first beam pair corresponds to a first antenna module of the UE. The communications manager 820 is capable of, configured to, or operable to support a means for receiving, from the network entity, a first module lock command including instructions for the UE to perform communications with the first antenna module for a duration of the first module lock command. The communications manager 820 is capable of, configured to, or operable to support a means for receiving, from the network entity, a first beam lock command including instructions for the UE to perform communications with the first beam pair for a duration of the first beam lock command. The communications manager 820 is capable of, configured to, or operable to support a means for performing a first set of measurements of the first beam pair at the first antenna module in accordance with the first module lock command and the first beam lock command. The communications manager 820 is capable of, configured to, or operable to support a means for receiving, from the network entity, a first beam lock deactivation command including instructions to release the first beam lock command of the first beam pair. The communications manager 820 is capable of, configured to, or operable to support a means for receiving, from the network entity, a first module lock deactivation command including instructions to release the first module lock command of the first antenna module.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of UE module lock function for millimeter wave frequencies as described herein, or the at least one processor 840 and the at least one memory 830 may be otherwise configured to, individually or collectively, perform or support such operations.

Figure 9:
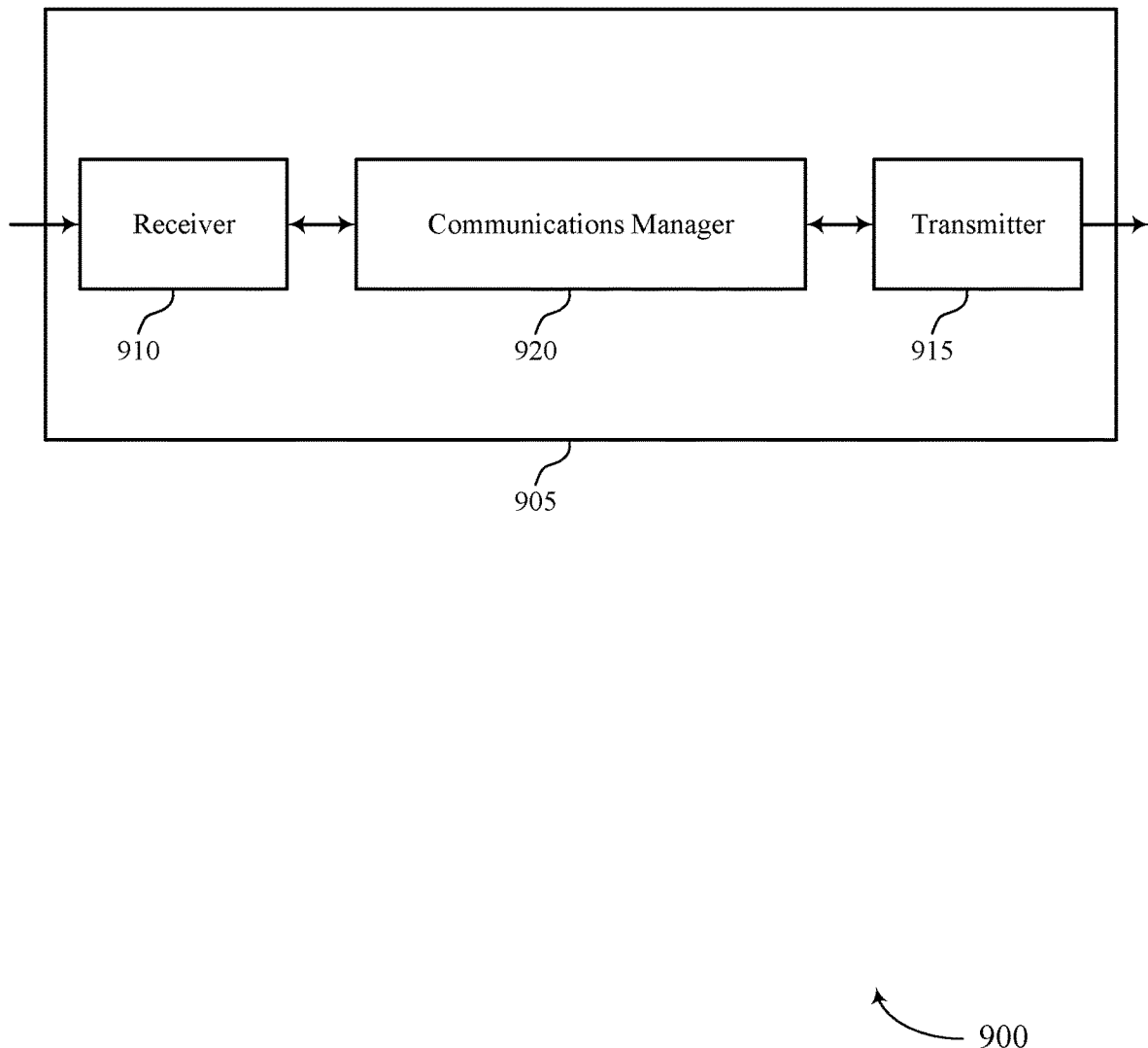
FIGS. 9 and 10 show block diagrams of devices that support UE antenna module lock function for millimeter wave frequencies in accordance with one or more aspects of the present disclosure.

FIG. 9 shows a block diagram 900 of a device 905 that supports UE module lock function for millimeter wave frequencies in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of UE module lock function for millimeter wave frequencies as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, a GPU, an NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in hardware, software (e.g., executed by at least one processor), or any combination thereof. If implemented in code executed by at least one processor, the functions of the communications manager 920, the receiver 910, the transmitter 915, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting, to a UE, a set of multiple beam-swept synchronization signals associated with a testing procedure for the UE. The communications manager 920 is capable of, configured to, or operable to support a means for receiving an indication of a first beam pair from a set of multiple beam pairs associated with the set of multiple beam-swept synchronization signals, where the first beam pair corresponds to a first antenna module of the UE. The communications manager 920 is capable of, configured to, or operable to support a means for transmitting, to the UE, a first module lock command including instructions for the UE to perform communications with the first antenna module for a duration of the first module lock command. The communications manager 920 is capable of, configured to, or operable to support a means for transmitting, to the UE, a first beam lock command including instructions for the UE to perform communications with the first beam pair for a duration of the first beam lock command. The communications manager 920 is capable of, configured to, or operable to support a means for receiving, from the UE via the first beam pair, a first uplink message in response to an uplink grant. The communications manager 920 is capable of, configured to, or operable to support a means for performing a first set of measurements of the first beam pair for the UE operating in accordance with the first module lock command and the first beam lock command. The communications manager 920 is capable of, configured to, or operable to support a means for transmitting, to the UE, a first beam lock deactivation command including instructions to release the first beam lock command of the first beam pair. The communications manager 920 is capable of, configured to, or operable to support a means for transmitting, to the UE, a first module lock deactivation command including instructions to release the first module lock command of the first antenna module.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
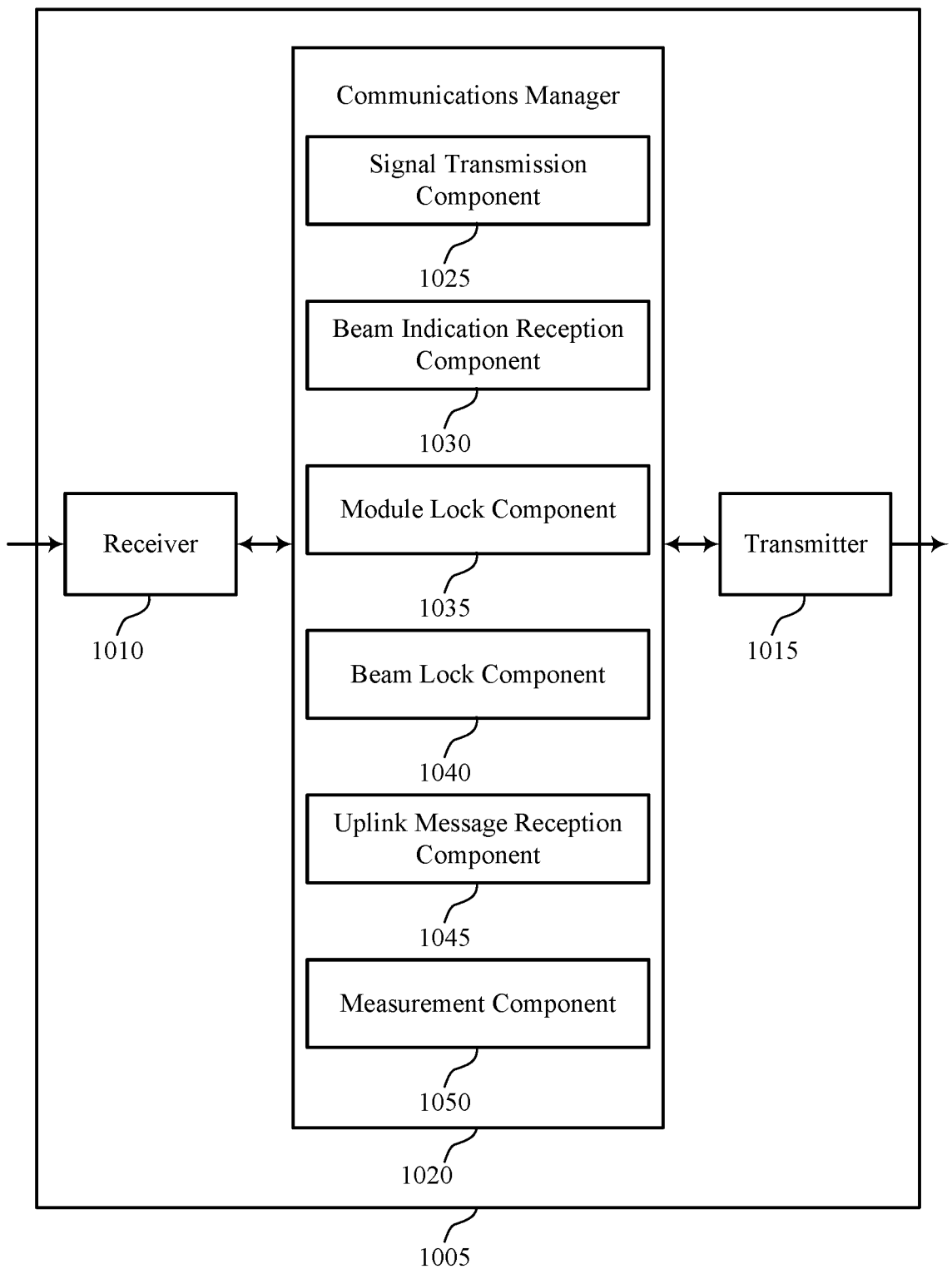

FIG. 10 shows a block diagram 1000 of a device 1005 that supports UE module lock function for millimeter wave frequencies in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of UE module lock function for millimeter wave frequencies as described herein. For example, the communications manager 1020 may include a signal transmission component 1025, a beam indication reception component 1030, a module lock component 1035, a beam lock component 1040, an uplink message reception component 1045, a measurement component 1050, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The signal transmission component 1025 is capable of, configured to, or operable to support a means for transmitting, to a UE, a set of multiple beam-swept synchronization signals associated with a testing procedure for the UE. The beam indication reception component 1030 is capable of, configured to, or operable to support a means for receiving an indication of a first beam pair from a set of multiple beam pairs associated with the set of multiple beam-swept synchronization signals, where the first beam pair corresponds to a first antenna module of the UE. The module lock component 1035 is capable of, configured to, or operable to support a means for transmitting, to the UE, a first module lock command including instructions for the UE to perform communications with the first antenna module for a duration of the first module lock command. The beam lock component 1040 is capable of, configured to, or operable to support a means for transmitting, to the UE, a first beam lock command including instructions for the UE to perform communications with the first beam pair for a duration of the first beam lock command. The uplink message reception component 1045 is capable of, configured to, or operable to support a means for receiving, from the UE via the first beam pair, a first uplink message in response to an uplink grant. The measurement component 1050 is capable of, configured to, or operable to support a means for performing a first set of measurements of the first beam pair for the UE operating in accordance with the first module lock command and the first beam lock command. The beam lock component 1040 is capable of, configured to, or operable to support a means for transmitting, to the UE, a first beam lock deactivation command including instructions to release the first beam lock command of the first beam pair. The module lock component 1035 is capable of, configured to, or operable to support a means for transmitting, to the UE, a first module lock deactivation command including instructions to release the first module lock command of the first antenna module.

Figure 11:
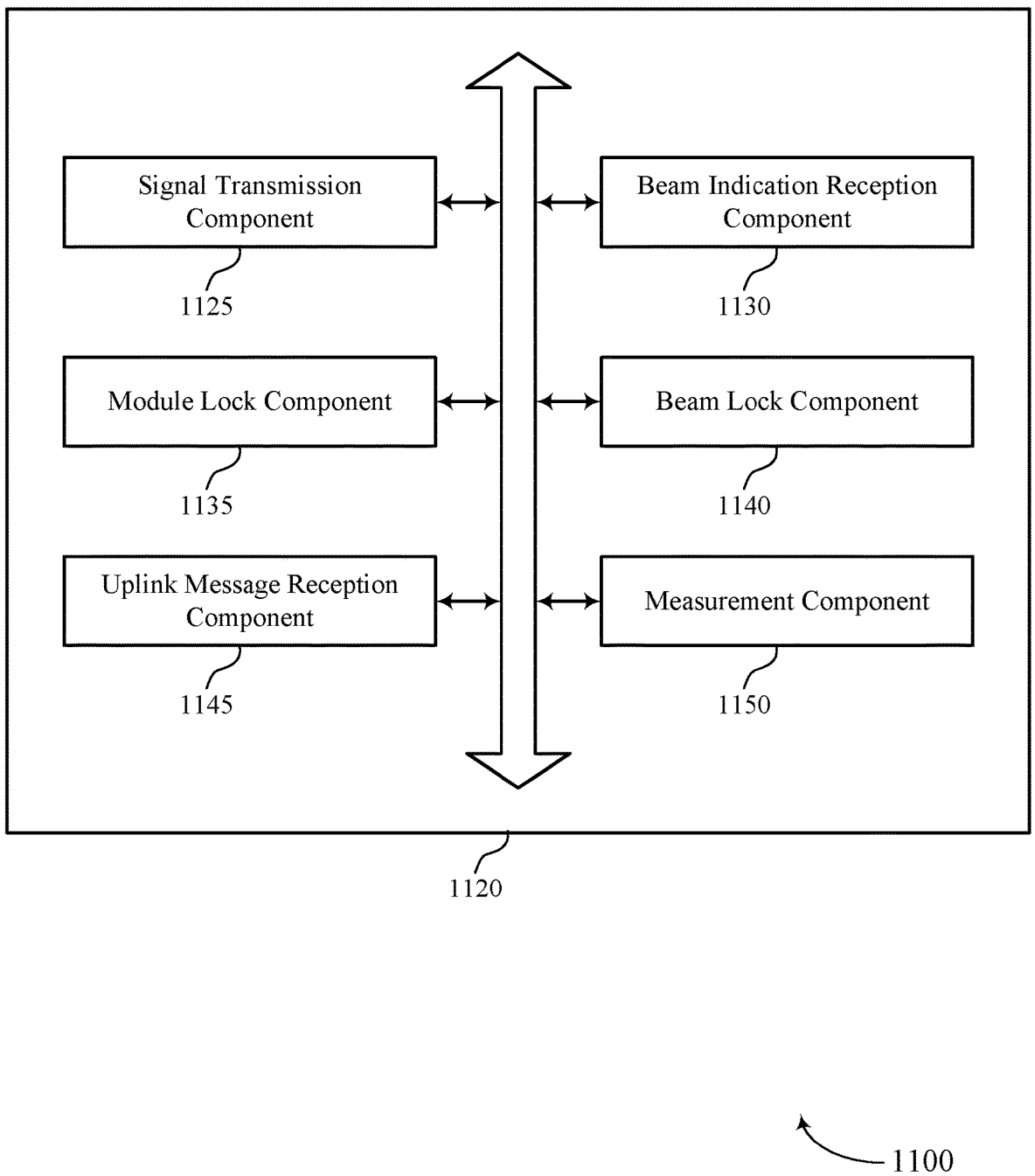
FIG. 11 shows a block diagram of a communications manager that supports UE antenna module lock function for millimeter wave frequencies in accordance with one or more aspects of the present disclosure.

FIG. 11 shows a block diagram 1100 of a communications manager 1120 that supports UE module lock function for millimeter wave frequencies in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of UE module lock function for millimeter wave frequencies as described herein. For example, the communications manager 1120 may include a signal transmission component 1125, a beam indication reception component 1130, a module lock component 1135, a beam lock component 1140, an uplink message reception component 1145, a measurement component 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The signal transmission component 1125 is capable of, configured to, or operable to support a means for transmitting, to a UE, a set of multiple beam-swept synchronization signals associated with a testing procedure for the UE. The beam indication reception component 1130 is capable of, configured to, or operable to support a means for receiving an indication of a first beam pair from a set of multiple beam pairs associated with the set of multiple beam-swept synchronization signals, where the first beam pair corresponds to a first antenna module of the UE. The module lock component 1135 is capable of, configured to, or operable to support a means for transmitting, to the UE, a first module lock command including instructions for the UE to perform communications with the first antenna module for a duration of the first module lock command. The beam lock component 1140 is capable of, configured to, or operable to support a means for transmitting, to the UE, a first beam lock command including instructions for the UE to perform communications with the first beam pair for a duration of the first beam lock command. The uplink message reception component 1145 is capable of, configured to, or operable to support a means for receiving, from the UE via the first beam pair, a first uplink message in response to an uplink grant. The measurement component 1150 is capable of, configured to, or operable to support a means for performing a first set of measurements of the first beam pair for the UE operating in accordance with the first module lock command and the first beam lock command. The beam lock component 1140 is capable of, configured to, or operable to support a means for transmitting, to the UE, a first beam lock deactivation command including instructions to release the first beam lock command of the first beam pair. The module lock component 1135 is capable of, configured to, or operable to support a means for transmitting, to the UE, a first module lock deactivation command including instructions to release the first module lock command of the first antenna module.

In some examples, the beam lock component 1140 is capable of, configured to, or operable to support a means for transmitting, to the UE prior to transmission of the first module lock command, a second beam lock command including instructions for the UE to perform communications with a second beam pair for a duration of the second beam lock command. In some examples, the measurement component 1150 is capable of, configured to, or operable to support a means for performing a second set of measurements of the second beam pair associated with the first antenna module in accordance with the first module lock command and the second beam lock command. In some examples, the beam lock component 1140 is capable of, configured to, or operable to support a means for transmitting, to the UE, a second beam lock deactivation command including instructions to release the second beam lock command of the second beam pair.

In some examples, the first module lock command enables a module lock function, and the module lock component 1135 is capable of, configured to, or operable to support a means for instructing the UE to refrain from switching from the first antenna module to a second antenna module in accordance with the module lock function.

In some examples, to support performing the first set of measurements, the measurement component 1150 is capable of, configured to, or operable to support a means for performing the first set of measurements for the UE at a first relative location or relative orientation. In some examples, to support performing the first set of measurements, the measurement component 1150 is capable of, configured to, or operable to support a means for performing, prior to transmitting the first module lock deactivation command, a second set of measurements for the UE at a second relative location or second relative orientation.

In some examples, the measurement component 1150 is capable of, configured to, or operable to support a means for performing, prior to transmission of the first module lock deactivation command, a set of multiple measurements for a set of multiple different beam pairs selected by the UE.

In some examples, each beam pair of the set of multiple beam pairs correspond to different relative locations of the UE, different relative orientations of the UE, or both.

In some examples, the measurement component 1150 is capable of, configured to, or operable to support a means for performing a second set of measurements in accordance with a second antenna module lock command, where the network entity transmits the first module lock deactivation command and the first beam lock deactivation command prior to performing the second set of measurements.

In some examples, to support transmitting the set of multiple beam-swept synchronization signals, the signal transmission component 1125 is capable of, configured to, or operable to support a means for transmitting the set of multiple beam-swept synchronization signals in accordance with a first polarization state of the network entity.

In some examples, the testing procedure includes a conformance testing procedure. In some examples, the network entity is configured in a field test mode. In some examples, the first set of measurements for the first beam pair include one or more spherical coverage metrics, including at least an effective isotropic radiated power, an effective isotropic sensitivity, or both.

Figure 12:
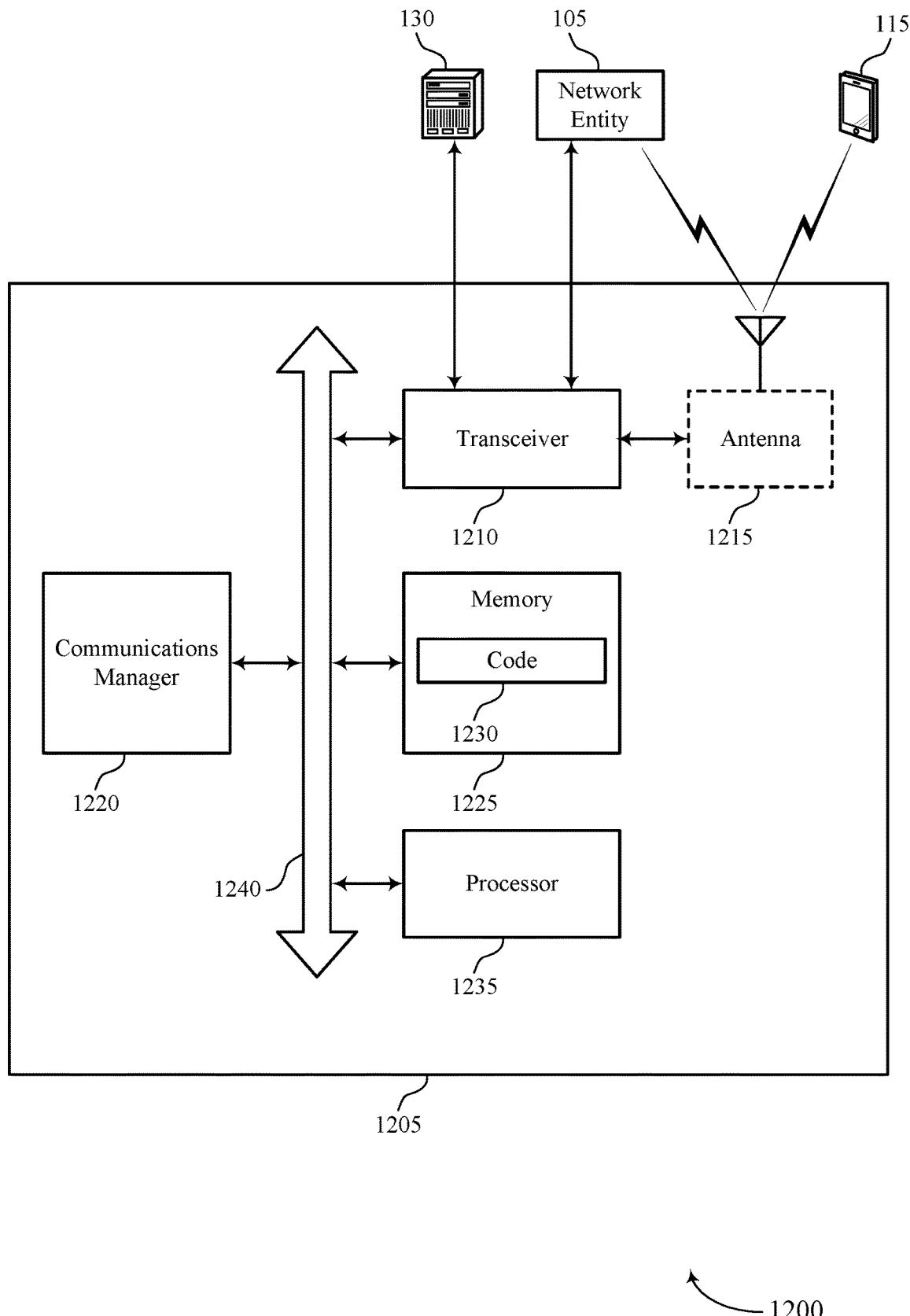
FIG. 12 shows a diagram of a system including a device that supports UE antenna module lock function for millimeter wave frequencies in accordance with one or more aspects of the present disclosure.

FIG. 12 shows a diagram of a system 1200 including a device 1205 that supports UE module lock function for millimeter wave frequencies in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, a GPU, an NPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting UE module lock function for millimeter wave frequencies). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting, to a UE, a set of multiple beam-swept synchronization signals associated with a testing procedure for the UE. The communications manager 1220 is capable of, configured to, or operable to support a means for receiving an indication of a first beam pair from a set of multiple beam pairs associated with the set of multiple beam-swept synchronization signals, where the first beam pair corresponds to a first antenna module of the UE. The communications manager 1220 is capable of, configured to, or operable to support a means for transmitting, to the UE, a first module lock command including instructions for the UE to perform communications with the first antenna module for a duration of the first module lock command. The communications manager 1220 is capable of, configured to, or operable to support a means for transmitting, to the UE, a first beam lock command including instructions for the UE to perform communications with the first beam pair for a duration of the first beam lock command. The communications manager 1220 is capable of, configured to, or operable to support a means for receiving, from the UE via the first beam pair, a first uplink message in response to an uplink grant. The communications manager 1220 is capable of, configured to, or operable to support a means for performing a first set of measurements of the first beam pair for the UE operating in accordance with the first module lock command and the first beam lock command. The communications manager 1220 is capable of, configured to, or operable to support a means for transmitting, to the UE, a first beam lock deactivation command including instructions to release the first beam lock command of the first beam pair. The communications manager 1220 is capable of, configured to, or operable to support a means for transmitting, to the UE, a first module lock deactivation command including instructions to release the first module lock command of the first antenna module.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of UE module lock function for millimeter wave frequencies as described herein, or the at least one processor 1235 and the at least one memory 1225 may be otherwise configured to, individually or collectively, perform or support such operations.

Figure 13:
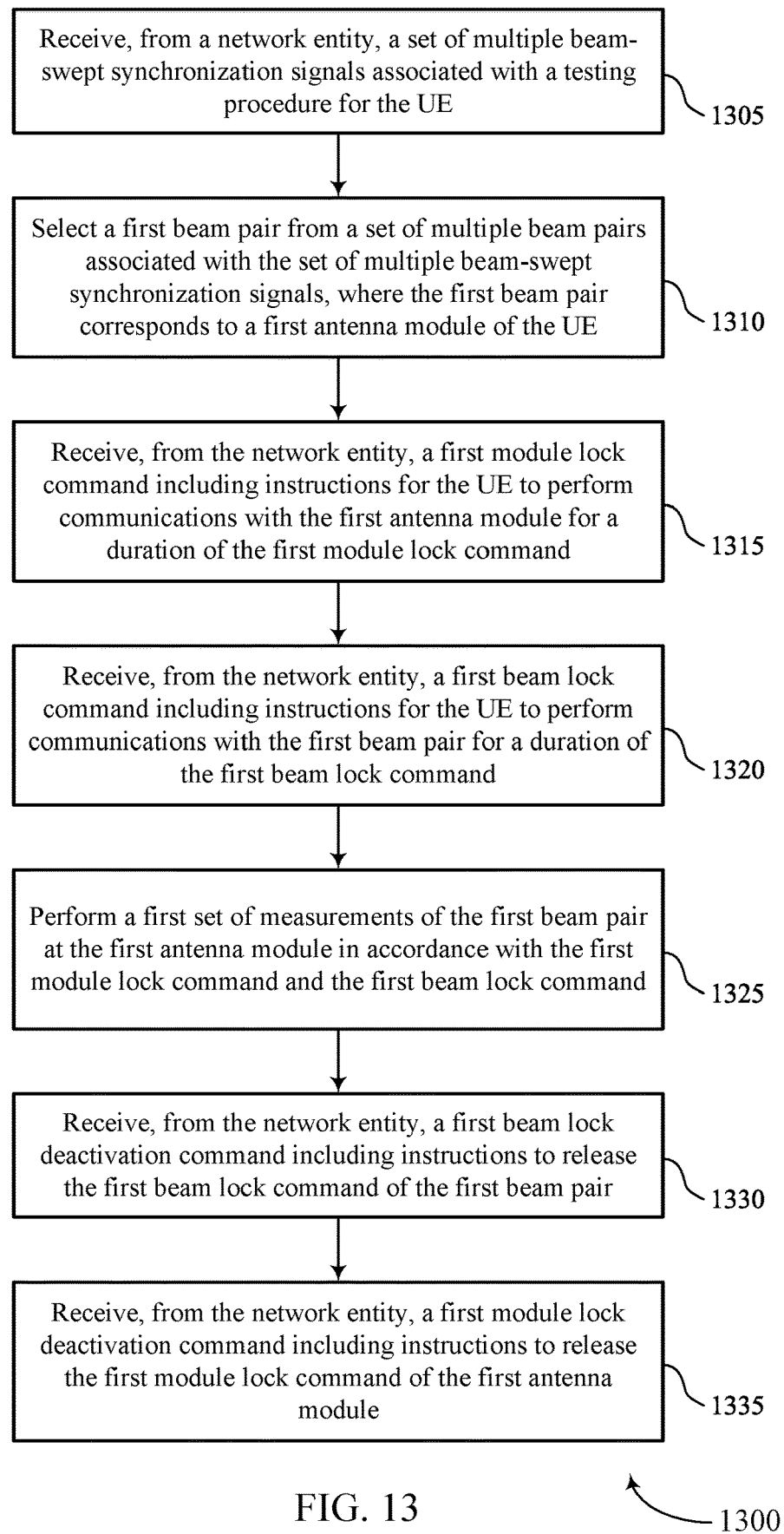
FIGS. 13 and 14 show flowcharts illustrating methods that support UE antenna module lock function for millimeter wave frequencies in accordance with one or more aspects of the present disclosure.

FIG. 13 shows a flowchart illustrating a method 1300 that supports UE module lock function for millimeter wave frequencies in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a set of multiple beam-swept synchronization signals associated with a testing procedure for the UE. The operations of block 1305 may be performed in accordance with examples as disclosed herein. In some examples, aspects of the operations of 1305 may be performed by a signal reception component 725 as described with reference to FIG. 7.

At 1310, the method may include selecting a first beam pair from a set of multiple beam pairs associated with the set of multiple beam-swept synchronization signals, where the first beam pair corresponds to a first antenna module of the UE. The operations of block 1310 may be performed in accordance with examples as disclosed herein. In some examples, aspects of the operations of 1310 may be performed by a beam selection component 730 as described with reference to FIG. 7.

At 1315, the method may include receiving, from the network entity, a first module lock command including instructions for the UE to perform communications with the first antenna module for a duration of the first module lock command. The operations of block 1315 may be performed in accordance with examples as disclosed herein. In some examples, aspects of the operations of 1315 may be performed by a module lock component 735 as described with reference to FIG. 7.

At 1320, the method may include receiving, from the network entity, a first beam lock command including instructions for the UE to perform communications with the first beam pair for a duration of the first beam lock command. The operations of block 1320 may be performed in accordance with examples as disclosed herein. In some examples, aspects of the operations of 1320 may be performed by a beam lock component 740 as described with reference to FIG. 7.

At 1325, the method may include performing a first set of measurements of the first beam pair at the first antenna module in accordance with the first module lock command and the first beam lock command. The operations of block 1325 may be performed in accordance with examples as disclosed herein. In some examples, aspects of the operations of 1325 may be performed by a measurement component 745 as described with reference to FIG. 7.

At 1330, the method may include receiving, from the network entity, a first beam lock deactivation command including instructions to release the first beam lock command of the first beam pair. The operations of block 1330 may be performed in accordance with examples as disclosed herein. In some examples, aspects of the operations of 1330 may be performed by a beam lock component 740 as described with reference to FIG. 7.

At 1335, the method may include receiving, from the network entity, a first module lock deactivation command including instructions to release the first module lock command of the first antenna module. The operations of block 1335 may be performed in accordance with examples as disclosed herein. In some examples, aspects of the operations of 1335 may be performed by a module lock component 735 as described with reference to FIG. 7.

Figure 14:
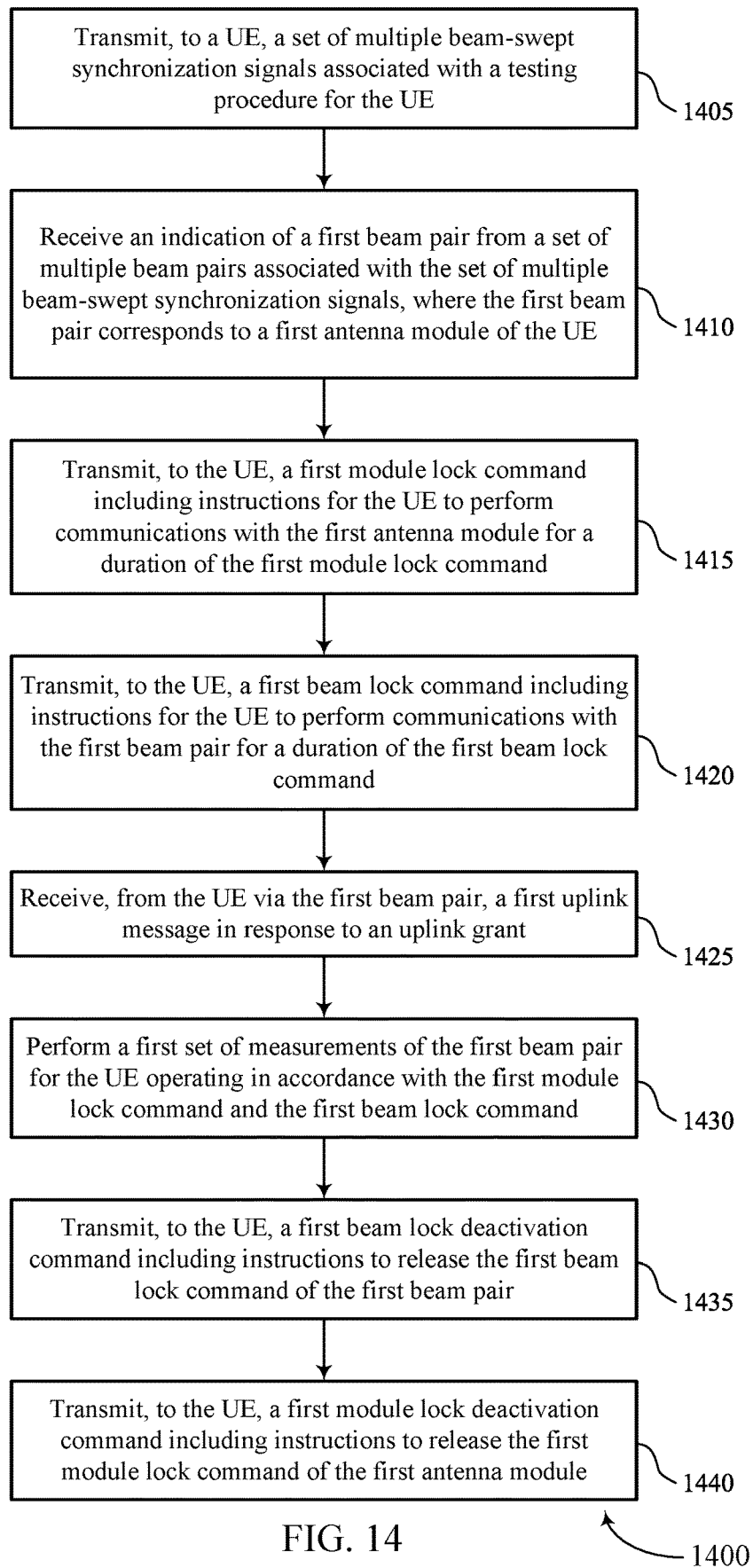

FIG. 14 shows a flowchart illustrating a method 1400 that supports UE module lock function for millimeter wave frequencies in accordance with aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a set of multiple beam-swept synchronization signals associated with a testing procedure for the UE. The operations of block 1405 may be performed in accordance with examples as disclosed herein. In some examples, aspects of the operations of 1405 may be performed by a signal transmission component 1125 as described with reference to FIG. 11.

At 1410, the method may include receiving an indication of a first beam pair from a set of multiple beam pairs associated with the set of multiple beam-swept synchronization signals, where the first beam pair corresponds to a first antenna module of the UE. The operations of block 1410 may be performed in accordance with examples as disclosed herein. In some examples, aspects of the operations of 1410 may be performed by a beam indication reception component 1130 as described with reference to FIG. 11.

At 1415, the method may include transmitting, to the UE, a first module lock command including instructions for the UE to perform communications with the first antenna module for a duration of the first module lock command. The operations of block 1415 may be performed in accordance with examples as disclosed herein. In some examples, aspects of the operations of 1415 may be performed by a module lock component 1135 as described with reference to FIG. 11.

At 1420, the method may include transmitting, to the UE, a first beam lock command including instructions for the UE to perform communications with the first beam pair for a duration of the first beam lock command. The operations of block 1420 may be performed in accordance with examples as disclosed herein. In some examples, aspects of the operations of 1420 may be performed by a beam lock component 1140 as described with reference to FIG. 11.

At 1425, the method may include receiving, from the UE via the first beam pair, a first uplink message in response to an uplink grant. The operations of block 1425 may be performed in accordance with examples as disclosed herein. In some examples, aspects of the operations of 1425 may be performed by an uplink message reception component 1145 as described with reference to FIG. 11.

At 1430, the method may include performing a first set of measurements of the first beam pair for the UE operating in accordance with the first module lock command and the first beam lock command. The operations of block 1430 may be performed in accordance with examples as disclosed herein. In some examples, aspects of the operations of 1430 may be performed by a measurement component 1150 as described with reference to FIG. 11.

At 1435, the method may include transmitting, to the UE, a first beam lock deactivation command including instructions to release the first beam lock command of the first beam pair. The operations of block 1435 may be performed in accordance with examples as disclosed herein. In some examples, aspects of the operations of 1435 may be performed by a beam lock component 1140 as described with reference to FIG. 11.

At 1440, the method may include transmitting, to the UE, a first module lock deactivation command including instructions to release the first module lock command of the first antenna module. The operations of block 1440 may be performed in accordance with examples as disclosed herein. In some examples, aspects of the operations of 1440 may be performed by a module lock component 1135 as described with reference to FIG. 11.

The following provides an overview of aspects of the present disclosure:

Aspect 1: A method for wireless communications at a UE, comprising: receiving, from a network entity, a plurality of beam-swept synchronization signals associated with a testing procedure for the UE; selecting a first beam pair from a plurality of beam pairs associated with the plurality of beam-swept synchronization signals, wherein the first beam pair corresponds to a first antenna module of the UE; receiving, from the network entity, a first module lock command comprising instructions for the UE to perform communications with the first antenna module for a duration of the first module lock command; receiving, from the network entity, a first beam lock command comprising instructions for the UE to perform communications with the first beam pair for a duration of the first beam lock command; performing a first set of measurements of the first beam pair at the first antenna module in accordance with the first module lock command and the first beam lock command; receiving, from the network entity, a first beam lock deactivation command comprising instructions to release the first beam lock command of the first beam pair; and receiving, from the network entity, a first module lock deactivation command comprising instructions to release the first module lock command of the first antenna module.

Aspect 2: The method of aspect 1, further comprising: selecting, prior to receiving the first module lock deactivation command, a second beam pair from the plurality of beam pairs, wherein the second beam pair corresponds to the first antenna module of the UE; receiving, from the network entity, a second beam lock command comprising instructions for the UE to perform communications with the second beam pair for a duration of the second beam lock command; performing a second set of measurements of the second beam pair at the first antenna module in accordance with the first module lock command and the second beam lock command; and receiving, from the network entity, a second beam lock deactivation command comprising instructions to release the second beam lock command of the second beam pair.

Aspect 3: The method of any of aspects 1 through 2, wherein the first module lock command enables a module lock function at the UE, the method further comprising: refraining from switching from the first antenna module to a second antenna module in accordance with the module lock function.

Aspect 4: The method of any of aspects 1 through 3, wherein performing the first set of measurements of the first beam pair at the first antenna module comprises: receiving, from the network entity, an uplink grant comprising a request for the first set of measurements of the first beam pair; and transmitting, in accordance with the uplink grant, an indication of the first set of measurements.

Aspect 5: The method of any of aspects 1 through 4, wherein performing the first set of measurements comprises: performing the first set of measurements at the UE, wherein the UE is at a first relative location or relative orientation; and performing, prior to receiving the first module lock deactivation command, a second set of measurements for a second beam pair at the UE, wherein the UE is at a second relative location or second relative orientation.

Aspect 6: The method of any of aspects 1 through 5, further comprising: performing, prior to receiving the first module lock deactivation command, a plurality of measurements for a plurality of different beam pairs selected by the UE.

Aspect 7: The method of any of aspects 1 through 6, wherein each beam pair of the plurality of beam pairs correspond to different relative locations of the UE, different relative orientations of the UE, or both.

Aspect 8: The method of any of aspects 1 through 7, further comprising: performing a second set of measurements for a second antenna module in accordance with a second antenna module lock command, wherein the UE receives the first module lock deactivation command and the first beam lock deactivation command prior to performing the second set of measurements.

Aspect 9: The method of any of aspects 1 through 8, wherein the first antenna module corresponds to a first antenna polarization.

Aspect 10: The method of any of aspects 1 through 9, wherein the testing procedure comprises a conformance testing procedure for the UE, the UE is configured in a field test mode.

Aspect 11: The method of any of aspects 1 through 10, wherein selecting the first beam pair comprises: selecting the first beam pair based at least in part on the first beam pair having a relative highest average reference signal receive power of the plurality of beam pairs.

Aspect 12: The method of any of aspects 1 through 11, wherein the first set of measurements for the first beam pair include one or more spherical coverage metrics of the UE, comprising at least an effective isotropic radiated power, an effective isotropic sensitivity, or both.

Aspect 13: A method for wireless communications at a network entity, comprising: transmitting, to a UE, a plurality of beam-swept synchronization signals associated with a testing procedure for the UE; receiving an indication of a first beam pair from a plurality of beam pairs associated with the plurality of beam-swept synchronization signals, wherein the first beam pair corresponds to a first antenna module of the UE; transmitting, to the UE, a first module lock command comprising instructions for the UE to perform communications with the first antenna module for a duration of the first module lock command; transmitting, to the UE, a first beam lock command comprising instructions for the UE to perform communications with the first beam pair for a duration of the first beam lock command; receiving, from the UE via the first beam pair, a first uplink message in response to an uplink grant; performing a first set of measurements of the first beam pair for the UE operating in accordance with the first module lock command and the first beam lock command; transmitting, to the UE, a first beam lock deactivation command comprising instructions to release the first beam lock command of the first beam pair; and transmitting, to the UE, a first module lock deactivation command comprising instructions to release the first module lock command of the first antenna module.

Aspect 14: The method of aspect 13, further comprising: transmitting, to the UE prior to transmission of the first module lock command, a second beam lock command comprising instructions for the UE to perform communications with a second beam pair for a duration of the second beam lock command; performing a second set of measurements of the second beam pair associated with the first antenna module in accordance with the first module lock command and the second beam lock command; and transmitting, to the UE, a second beam lock deactivation command comprising instructions to release the second beam lock command of the second beam pair.

Aspect 15: The method of any of aspects 13 through 14, wherein the first module lock command enables a module lock function, the method further comprising: instructing the UE to refrain from switching from the first antenna module to a second antenna module in accordance with the module lock function.

Aspect 16: The method of any of aspects 13 through 15, wherein performing the first set of measurements comprises: performing the first set of measurements for the UE at a first relative location or relative orientation; and performing, prior to transmitting the first module lock deactivation command, a second set of measurements for the UE at a second relative location or second relative orientation.

Aspect 17: The method of any of aspects 13 through 16, further comprising: performing, prior to transmission of the first module lock deactivation command, a plurality of measurements for a plurality of different beam pairs selected by the UE.

Aspect 18: The method of any of aspects 13 through 17, wherein each beam pair of the plurality of beam pairs correspond to different relative locations of the UE, different relative orientations of the UE, or both.

Aspect 19: The method of any of aspects 13 through 18, further comprising: performing a second set of measurements in accordance with a second antenna module lock command, wherein the network entity transmits the first module lock deactivation command and the first beam lock deactivation command prior to performing the second set of measurements.

Aspect 20: The method of any of aspects 13 through 19, wherein transmitting the plurality of beam-swept synchronization signals comprises: transmitting the plurality of beam-swept synchronization signals in accordance with a first polarization state of the network entity.

Aspect 21: The method of any of aspects 13 through 20, wherein the testing procedure comprises a conformance testing procedure, the network entity is configured in a field test mode.

Aspect 22: The method of any of aspects 13 through 21, wherein the first set of measurements for the first beam pair include one or more spherical coverage metrics, comprising at least an effective isotropic radiated power, an effective isotropic sensitivity, or both.

Aspect 23: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the UE to perform a method of any of aspects 1 through 12.

Aspect 24: A UE for wireless communications, comprising at least one means for performing a method of any of aspects 1 through 12.

Aspect 25: A non-transitory computer-readable medium storing code for wireless communications, the code comprising instructions executable by at least one processor (e.g., directly, indirectly, after pre-processing, without pre-processing) to perform a method of any of aspects 1 through 12.

Aspect 26: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the network entity to perform a method of any of aspects 13 through 22.

Aspect 27: A network entity for wireless communications, comprising at least one means for performing a method of any of aspects 13 through 22.

Aspect 28: A non-transitory computer-readable medium storing code for wireless communications, the code comprising instructions executable by at least one processor (e.g., directly, indirectly, after pre-processing, without pre-processing) to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communications system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network entity, a plurality of beam-swept synchronization signals associated with a testing procedure for the UE;
select a first beam pair from a plurality of beam pairs associated with the plurality of beam-swept synchronization signals, wherein the first beam pair corresponds to a first antenna module of the UE;
receive, from the network entity, a first module lock command comprising instructions for the UE to perform communications with the first antenna module for a duration of the first module lock command;
receive, from the network entity, a first beam lock command comprising instructions for the UE to perform communications with the first beam pair for a duration of the first beam lock command;
perform a first set of measurements of the first beam pair at the first antenna module in accordance with the first module lock command and the first beam lock command;
receive, from the network entity, a first beam lock deactivation command comprising instructions to release the first beam lock command of the first beam pair; and
receive, from the network entity, a first module lock deactivation command comprising instructions to release the first module lock command of the first antenna module.

2. The UE of claim 1, wherein the one or more processors are individually or collectively further operable to execute the code to cause the UE to:
select, prior to receiving the first module lock deactivation command, a second beam pair from the plurality of beam pairs, wherein the second beam pair corresponds to the first antenna module of the UE;
receive, from the network entity, a second beam lock command comprising instructions for the UE to perform communications with the second beam pair for a duration of the second beam lock command;
perform a second set of measurements of the second beam pair at the first antenna module in accordance with the first module lock command and the second beam lock command; and
receive, from the network entity, a second beam lock deactivation command comprising instructions to release the second beam lock command of the second beam pair.

3. The UE of claim 1, wherein the first module lock command enables a module lock function at the UE, and the one or more processors are individually or collectively further operable to execute the code to cause the UE to:
refrain from switching from the first antenna module to a second antenna module in accordance with the module lock function.

4. The UE of claim 1, wherein, to perform the first set of measurements of the first beam pair at the first antenna module, the one or more processors are individually or collectively operable to execute the code to cause the UE to:
receive, from the network entity, an uplink grant comprising a request for the first set of measurements of the first beam pair; and transmit, in accordance with the uplink grant, an indication of the first set of measurements.

5. The UE of claim 1, wherein, to perform the first set of measurements, the one or more processors are individually or collectively operable to execute the code to cause the UE to:
perform the first set of measurements at the UE, wherein the UE is at a first relative location or relative orientation; and
perform, prior to receiving the first module lock deactivation command, a second set of measurements for a second beam pair at the UE, wherein the UE is at a second relative location or second relative orientation.

6. The UE of claim 1, wherein the one or more processors are individually or collectively further operable to execute the code to cause the UE to:
perform, prior to receiving the first module lock deactivation command, a plurality of measurements for a plurality of different beam pairs selected by the UE.

7. The UE of claim 1, wherein each beam pair of the plurality of beam pairs correspond to different relative locations of the UE, different relative orientations of the UE, or both.

8. The UE of claim 1, wherein the one or more processors are individually or collectively further operable to execute the code to cause the UE to:
perform a second set of measurements for a second antenna module in accordance with a second antenna module lock command, wherein the UE receives the first module lock deactivation command and the first beam lock deactivation command prior to performing the second set of measurements.

9. The UE of claim 1, wherein the first antenna module corresponds to a first antenna polarization.

10. The UE of claim 1, wherein the testing procedure comprises a conformance testing procedure for the UE, wherein the UE is configured in a field test mode.

11. The UE of claim 1, wherein, to select the first beam pair, the one or more processors are individually or collectively operable to execute the code to cause the UE to:
select the first beam pair based at least in part on the first beam pair having a relative highest average reference signal receive power of the plurality of beam pairs.

12. The UE of claim 1, wherein the first set of measurements for the first beam pair include one or more spherical coverage metrics of the UE comprising at least an effective isotropic radiated power, an effective isotropic sensitivity, or both.

13. A network entity, comprising:
one or more memories storing processor-executable code; and
one or more processors coupled with the one or more memories and individually or collectively operable to execute the code to cause the network entity to:
transmit, to a user equipment (UE), a plurality of beam-swept synchronization signals associated with a testing procedure for the UE;
receive an indication of a first beam pair from a plurality of beam pairs associated with the plurality of beam-swept synchronization signals, wherein the first beam pair corresponds to a first antenna module of the UE;
transmit, to the UE, a first module lock command comprising instructions for the UE to perform communications with the first antenna module for a duration of the first module lock command;
transmit, to the UE, a first beam lock command comprising instructions for the UE to perform communications with the first beam pair for a duration of the first beam lock command;
receive, from the UE via the first beam pair, a first uplink message in response to an uplink grant;
perform a first set of measurements of the first beam pair for the UE operating in accordance with the first module lock command and the first beam lock command;
transmit, to the UE, a first beam lock deactivation command comprising instructions to release the first beam lock command of the first beam pair; and
transmit, to the UE, a first module lock deactivation command comprising instructions to release the first module lock command of the first antenna module.

14. The network entity of claim 13, wherein the one or more processors are individually or collectively further operable to execute the code to cause the network entity to:
transmit, to the UE prior to transmission of the first module lock command, a second beam lock command comprising instructions for the UE to perform communications with a second beam pair for a duration of the second beam lock command;
perform a second set of measurements of the second beam pair associated with the first antenna module in accordance with the first module lock command and the second beam lock command; and
transmit, to the UE, a second beam lock deactivation command comprising instructions to release the second beam lock command of the second beam pair.

15. The network entity of claim 13, wherein the first module lock command enables a module lock function, and the one or more processors are individually or collectively further operable to execute the code to cause the network entity to:
instruct the UE to refrain from switching from the first antenna module to a second antenna module in accordance with the module lock function.

16. The network entity of claim 13, wherein, to perform the first set of measurements, the one or more processors are individually or collectively operable to execute the code to cause the network entity to:
perform the first set of measurements for the UE at a first relative location or relative orientation; and
perform, prior to transmitting the first module lock deactivation command, a second set of measurements for the UE at a second relative location or second relative orientation.

17. The network entity of claim 13, wherein the one or more processors are individually or collectively further operable to execute the code to cause the network entity to:
perform, prior to transmission of the first module lock deactivation command, a plurality of measurements for a plurality of different beam pairs selected by the UE.

18. The network entity of claim 13, wherein each beam pair of the plurality of beam pairs correspond to different relative locations of the UE, different relative orientations of the UE, or both.

19. The network entity of claim 13, wherein the one or more processors are individually or collectively further operable to execute the code to cause the network entity to:
perform a second set of measurements in accordance with a second antenna module lock command, wherein the network entity transmits the first module lock deactivation command and the first beam lock deactivation command prior to performing the second set of measurements.

20. The network entity of claim 13, wherein, to transmit the plurality of beam-swept synchronization signals, the one or more processors are individually or collectively operable to execute the code to cause the network entity to:
transmit the plurality of beam-swept synchronization signals in accordance with a first polarization state of the network entity.

21. The network entity of claim 13, wherein the testing procedure comprises a conformance testing procedure, wherein the network entity is configured in a field test mode.

22. The network entity of claim 13, wherein the first set of measurements for the first beam pair include one or more spherical coverage metrics, comprising at least an effective isotropic radiated power, an effective isotropic sensitivity, or both.

23. A method for wireless communications at a user equipment (UE), comprising:
receiving, from a network entity, a plurality of beam-swept synchronization signals associated with a testing procedure for the UE;
selecting a first beam pair from a plurality of beam pairs associated with the plurality of beam-swept synchronization signals, wherein the first beam pair corresponds to a first antenna module of the UE;
receiving, from the network entity, a first module lock command comprising instructions for the UE to perform communications with the first antenna module for a duration of the first module lock command;
receiving, from the network entity, a first beam lock command comprising instructions for the UE to perform communications with the first beam pair for a duration of the first beam lock command;
performing a first set of measurements of the first beam pair at the first antenna module in accordance with the first module lock command and the first beam lock command;
receiving, from the network entity, a first beam lock deactivation command comprising instructions to release the first beam lock command of the first beam pair; and
receiving, from the network entity, a first module lock deactivation command comprising instructions to release the first module lock command of the first antenna module.

24. The method of claim 23, further comprising:
selecting, prior to receiving the first module lock deactivation command, a second beam pair from the plurality of beam pairs, wherein the second beam pair corresponds to the first antenna module of the UE;
receiving, from the network entity, a second beam lock command comprising instructions for the UE to perform communications with the second beam pair for a duration of the second beam lock command;
performing a second set of measurements of the second beam pair at the first antenna module in accordance with the first module lock command and the second beam lock command; and
receiving, from the network entity, a second beam lock deactivation command comprising instructions to release the second beam lock command of the second beam pair.

25. The method of claim 23, wherein the first module lock command enables a module lock function at the UE, the method further comprising:
refraining from switching from the first antenna module to a second antenna module in accordance with the module lock function.

26. The method of claim 23, wherein performing the first set of measurements of the first beam pair at the first antenna module comprises:
receiving, from the network entity, an uplink grant comprising a request for the first set of measurements of the first beam pair; and
transmitting, in accordance with the uplink grant, an indication of the first set of measurements.

27. The method of claim 23, wherein performing the first set of measurements comprises:
performing the first set of measurements at the UE, wherein the UE is at a first relative location or relative orientation; and
performing, prior to receiving the first module lock deactivation command, a second set of measurements for a second beam pair at the UE, wherein the UE is at a second relative location or second relative orientation.

28. The method of claim 23, further comprising:
performing, prior to receiving the first module lock deactivation command, a plurality of measurements for a plurality of different beam pairs selected by the UE.

29. The method of claim 23, wherein each beam pair of the plurality of beam pairs correspond to different relative locations of the UE, different relative orientations of the UE, or both.

30. A method for wireless communications at a network entity, comprising:
transmitting, to a user equipment (UE), a plurality of beam-swept synchronization signals associated with a testing procedure for the UE;
receiving an indication of a first beam pair from a plurality of beam pairs associated with the plurality of beam-swept synchronization signals, wherein the first beam pair corresponds to a first antenna module of the UE;
transmitting, to the UE, a first module lock command comprising instructions for the UE to perform communications with the first antenna module for a duration of the first module lock command;
transmitting, to the UE, a first beam lock command comprising instructions for the UE to perform communications with the first beam pair for a duration of the first beam lock command;
receiving, from the UE via the first beam pair, a first uplink message in response to an uplink grant;
performing a first set of measurements of the first beam pair for the UE operating in accordance with the first module lock command and the first beam lock command;
transmitting, to the UE, a first beam lock deactivation command comprising instructions to release the first beam lock command of the first beam pair; and
transmitting, to the UE, a first module lock deactivation command comprising instructions to release the first module lock command of the first antenna module.

* * * * *